(12) United States Patent
Tokito

(10) Patent No.: US 11,412,121 B2
(45) Date of Patent: Aug. 9, 2022

(54) VEHICLE-MOUNTED CAMERA

(71) Applicant: Sony Semiconductor Solutions Corporation, Kanagawa (JP)

(72) Inventor: Toshihiro Tokito, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/289,195

(22) PCT Filed: Nov. 8, 2019

(86) PCT No.: PCT/JP2019/043877
§ 371 (c)(1),
(2) Date: Apr. 27, 2021

(87) PCT Pub. No.: WO2020/100741
PCT Pub. Date: May 22, 2020

(65) Prior Publication Data
US 2021/0344824 A1    Nov. 4, 2021

(30) Foreign Application Priority Data
Nov. 15, 2018   (JP) .............................. JP2018-214502

(51) Int. Cl.
*H04N 5/225*    (2006.01)
*B60R 1/00*     (2022.01)

(52) U.S. Cl.
CPC ............. *H04N 5/2257* (2013.01); *B60R 1/00* (2013.01); *H04N 5/2252* (2013.01)

(58) Field of Classification Search
CPC ....... H04N 5/2257; H04N 5/2252; B60R 1/00
(Continued)

(56) References Cited

U.S. PATENT DOCUMENTS 8,400,560 B1 *   3/2013   Yang ................... H04N 5/2252
                                                    348/148
2006/0222300 A1 * 10/2006  Frenzel ............. H01L 27/14618
                                                    257/E31.127
(Continued)

FOREIGN PATENT DOCUMENTS

CN        206674070 U      11/2017
DE     102017221428 A1      5/2018
(Continued)

OTHER PUBLICATIONS

International Search Report and English translation thereof dated Dec. 17, 2019 in connection with International Application No. PCT/JP2019/043877.

*Primary Examiner* — Joseph G Ustaris
*Assistant Examiner* — Matthew David Kim
(74) *Attorney, Agent, or Firm* — Wolf, Greenfield & Sacks, P.C.

(57) ABSTRACT

[SUMMARY]
[OBJECT] To provide a vehicle-mounted camera capable of achieving both of miniaturization and high functionality.
[MEANS FOR SOLVING] The vehicle-mounted camera includes an optical unit, a frame, a cover member, a holder, and a pair of screw members. The frame includes a front wall portion having a flat plate shape and extending along a plane orthogonal to an axis, and a pair of first through-hole portions provided to the front wall portion. The cover member includes a pair of second through-hole portions adjacent to the pair of first through-hole portions in a forward direction of the axis. The holder includes a holding portion that holds the optical unit, a pair of columnar portions that protrude in the forward direction and are inserted into the pair of first through-hole portions and the pair of second through-hole portions from a rearward direction of the axis, and a pair of screw hole portions formed (Continued)

toward the rearward direction from distal end portions of the pair of columnar portions. The pair of screw members fix the holder and the cover member to the frame by being inserted into the pair of second through-hole portions from the forward direction and fastened to the pair of screw hole portions.

10 Claims, 15 Drawing Sheets

(58) Field of Classification Search
USPC .......................................................... 348/148
See application file for complete search history.

(56) References Cited

U.S. PATENT DOCUMENTS

| | | | |
|---|---|---|---|
| 2010/0097519 A1* | 4/2010 | Byrne | B60R 1/00 348/373 |
| 2016/0191863 A1* | 6/2016 | Minikey, Jr. | G02B 7/02 348/148 |
| 2016/0307953 A1* | 10/2016 | Kono | H04N 5/2252 |
| 2016/0318458 A1* | 11/2016 | Wato | B60R 11/04 |
| 2021/0197733 A1* | 7/2021 | Percival | H04N 5/2257 |

FOREIGN PATENT DOCUMENTS

| | | |
|---|---|---|
| JP | 2012-080371 A | 4/2012 |
| JP | 2016-014564 A | 1/2016 |
| JP | 2016-203952 A | 12/2016 |
| JP | 2016-208125 A | 12/2016 |
| JP | 2018-509021 A | 3/2018 |
| WO | WO 2016/109790 A1 | 7/2016 |

\* cited by examiner

VEHICLE-MOUNTED CAMERA

CROSS REFERENCE TO RELATED APPLICATIONS

This is a U.S. National Stage Application under 35 U.S.C. § 371, based on International Application No. PCT/JP2019/043877, filed Nov. 8, 2019, which claims priority to Japanese Patent Application JP 2018-214502, filed Nov. 15, 2018, each of which is hereby incorporated by reference in its entirety.

FIELD OF THE INVENTION

The present technology relates to a vehicle-mounted camera capable of capturing an image of an external environment of a movable body.

BACKGROUND ART

A technique of using a front camera for drive control of an automobile is known (see, for example, Patent Document 1). In the front camera described in Patent Document 1, the imaging device board on which the imaging device is mounted is disposed behind the back surface of the holder for holding the lens, in order that light incident on the lens from the front external environment is made incident on the imaging device.

PRIOR ART DOCUMENT

Patent Document

[Patent Document 1] Japanese Patent Application Laid-open No. 2016-14564

SUMMARY OF THE INVENTION

Problems to be Solved by the Invention

In general, the front camera is located on the inner side of the windshield. For that reason, the front camera is required to be further miniaturized from the viewpoint of ensuring a wider field of view of the driver, etc. On the other hand, the front camera is required to have further enhanced functions in order to cope with more sophisticated drive control of automobiles.

In the front camera described in Patent Document 1, the holder is screwed to the housing from the back side. Thus, in the region screwed to the housing on the back surface of the holder, the head of the screw hinders the arrangement of the imaging device board. Therefore, it is necessary to separately provide a region for disposing the imaging device board and a region to be screwed to the housing, to the back surface of the holder.

Thus, in such a front camera, when the miniaturization of the holder is prioritized, high functionality is hindered because the size of the imaging device board is limited. On the other hand, when the expansion of the functionality by the extension of the mounting surface of the imaging device board is prioritized, it is necessary to further increase the size of the holder. In other words, in such a front camera, the miniaturization and the high functionality have a trade-off relationship.

In view of the circumstances as described above, it is an object of the present technology to provide a vehicle-mounted camera capable of achieving both of miniaturization and high functionality.

Means for Solving the Problems

In order to achieve the above object, a vehicle-mounted camera according to an embodiment of the present technology includes an optical unit, a frame, a cover member, a holder, and a pair of screw members.

The optical unit includes a lens.

The frame includes a front wall portion having a flat plate shape and extending along a plane orthogonal to an axis, and a pair of first through-hole portions provided to the front wall portion.

The cover member includes a pair of second through-hole portions adjacent to the pair of first through-hole portions in a forward direction of the axis.

The holder includes a holding portion that holds the optical unit, a pair of columnar portions that protrude in the forward direction and are inserted into the pair of first through-hole portions and the pair of second through-hole portions from a rearward direction of the axis, and a pair of screw hole portions formed toward the rearward direction from distal end portions of the pair of columnar portions.

The pair of screw members fix the holder and the cover member to the frame by being inserted into the pair of second through-hole portions from the forward direction and fastened to the pair of screw hole portions.

The vehicle-mounted camera may further include an imaging device board disposed on a back surface of the holder, the back surface facing in the rearward direction.

The imaging device board may face at least one of the pair of screw hole portions in the rearward direction.

In the vehicle-mounted camera, the cover member and the holder are screwed to the frame from the front. Thus, the vehicle-mounted camera can have a configuration in which the screw members do not protrude behind the holder. As a result, in this vehicle-mounted camera, the shape and layout of the components such as the imaging device board disposed on the back surface of the holder is not limited by the holder.

The pair of screw hole portions may not penetrate the holder in the rearward direction.

This configuration makes it possible to prevent foreign matter generated when the screw members are fastened to the screw hole portions from being mixed on the back surface side of the holder.

The optical unit may have an optical axis inclined with respect to the axis.

The holder may further include a regulating surface inclined with respect to a plane orthogonal to the optical axis and regulated by a back surface of the front wall portion, the back surface facing in the rearward direction.

The regulating surface may include a pair of regulating surfaces respectively extending around rear end portions of the pair of columnar portions.

In the vehicle-mounted camera disposed on the inner surface of the windshield, the optical axis of the optical unit is likely to be inclined downward. In this regard, this configuration makes it possible to bringing the direction of the optical axis of the optical unit close to being horizontal by inclining the optical axis of the optical unit upward.

The cover member may further include a pair of boss portions that protrude in the direction of the axis and include the pair of second through-hole portions.

In this configuration, since the second through-hole portions are elongated in the direction of the axis, the cover member is positioned more accurately by the columnar portions of the holder.

The cover member may be a resin molded product.
The frame may be a sheet metal processed product.
The holder may be a die-cast product.

Those configurations are particularly suitable to manufacture the vehicle-mounted camera that produces the effects described above.

BEST MODE FOR CARRYING OUT THE INVENTION

An embodiment of the present technology will now be described below with reference to the drawings. Each of the drawings shows the X-axis, the Y-axis, and the Z-axis, which are appropriately orthogonal to each other.

Figure 1:
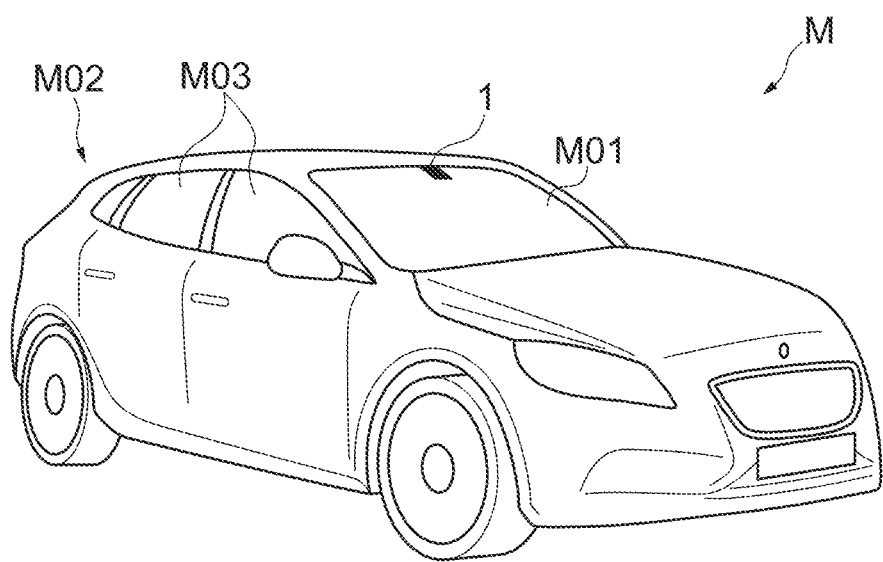
FIG. 1 is a perspective view of an automobile that includes a vehicle-mounted camera according to an embodiment of the present technology.

[Overall Configuration of Vehicle-Mounted Camera 1]
FIG. 1 is a perspective view of an automobile M that includes a vehicle-mounted camera 1 according to an embodiment of the present technology. The automobile M includes, as transparent glass windows, a windshield (front window) M01 disposed in front, a rear window M02 disposed in the rear, and side windows M03 disposed on the opposite lateral sides.

The vehicle-mounted camera 1 is a front sensing camera attached to an inner surface of the windshield M01. The vehicle-mounted camera 1 is disposed in an upper portion of a central region in a width direction of the windshield M01. This enables the vehicle-mounted camera 1 to successfully capture an image of the scenery ahead of the automobile M without obstructing the view of a driver.

The automobile M including the vehicle-mounted camera 1 includes therein a driving force generating mechanism including, for example, an engine and a motor, a braking mechanism, a steering mechanism, and the like, in order to implement a traveling function. Further, the automobile M may include, for example, a surrounding information detector used to detect surrounding information, and a positioning section used to generate position information.

Figure 2:
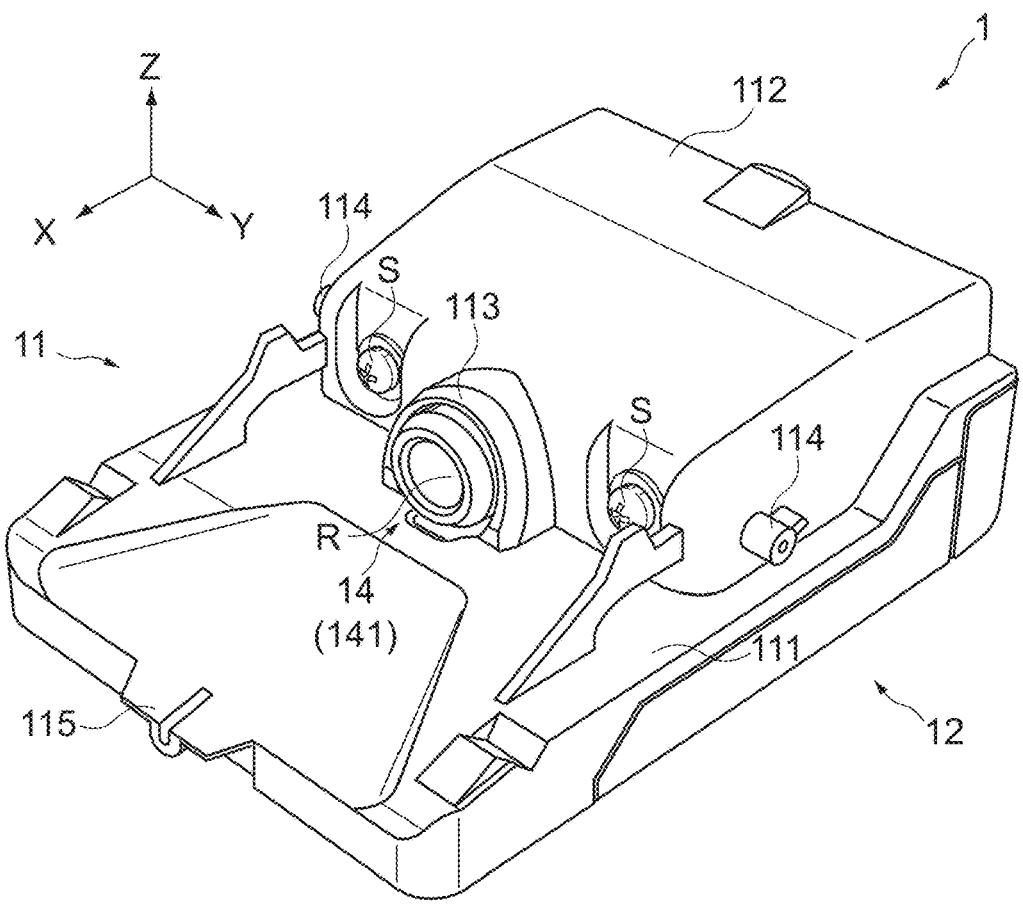
FIG. 2 is a perspective view of the vehicle-mounted camera.

FIG. 2 is a perspective view of the vehicle-mounted camera 1 before being attached to the windshield M01. The vehicle-mounted camera 1 includes a front case 11 and a bottom case 12. The front case 11 is configured as a cover member that covers the upper side of the bottom case 12 in the Z-axis direction. Additionally, the vehicle-mounted camera 1 includes an imaging unit 14 including an optical unit 141 that holds a lens R.

The front case 11 includes a flat portion 111 extending along the X-Y plane, and a box-shaped housing portion 112 disposed rearward in the X-axis direction and protruding upward in the Z-axis direction from the flat portion 111. The housing portion 112 mainly houses each structural element of the vehicle-mounted camera 1 such as the imaging unit 14 in a space formed therein.

In the housing portion 112, a lens hole 113 penetrating in the X-axis direction is formed in the central portion in the Y-axis direction of the front facing forward in the X-axis direction. The optical unit 141 of the imaging unit 14 is inserted into the lens hole 113 from the inside of the housing portion 112. As a result, in the vehicle-mounted camera 1, the lens R of the optical unit 141 is exposed to the external space toward the front in the X-axis direction.

Additionally, the housing portion 112 includes protrusions 114 protruding outward in the Y-axis direction on both side surfaces facing in the Y-axis direction. Additionally, the housing portion 112 includes an extension piece 115 extending forward in the X-axis direction in the central portion in the Y-axis direction of a front edge portion of the flat portion 111 in the X-axis direction. The protrusions 114 and the extension piece 115 are used for installation of the vehicle-mounted camera 1.

Figure 3:
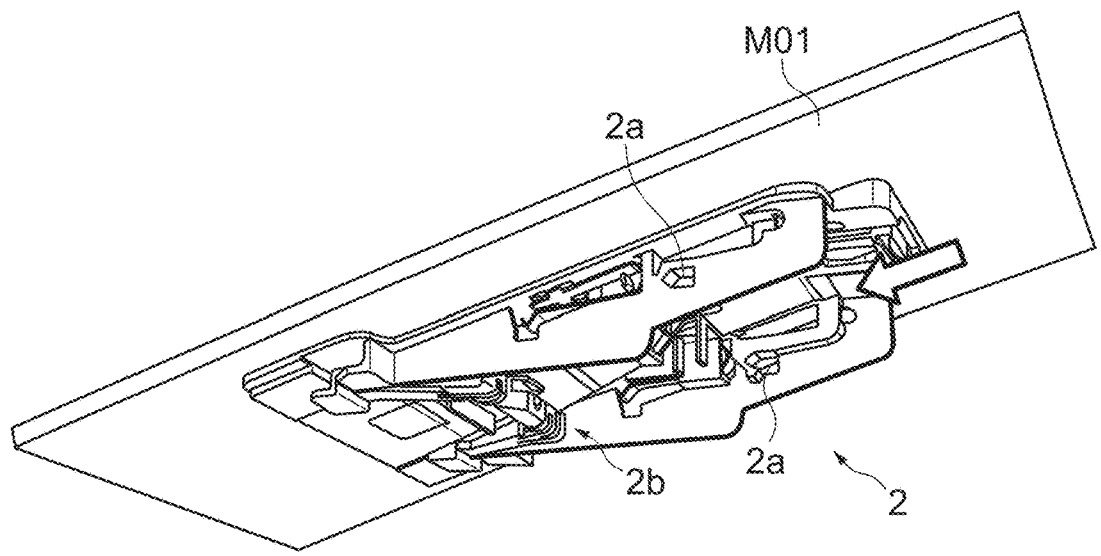
FIG. 3 is a perspective view of a bracket capable of mounting the vehicle-mounted camera.

FIG. 3 is a perspective view of a bracket 2 for installing the vehicle-mounted camera 1 on the inner surface of the windshield M01 of the automobile M. The bracket 2 is fixed to the inner surface of the windshield M01. The bracket 2 includes engagement holes 2a engageable with the protrusions 114 and a V-shaped engagement hole 2b engageable with the extension piece 115.

The vehicle-mounted camera 1 is inserted into the bracket 2 in the direction indicated by the block arrow in FIG. 3, with the front case 11 facing the windshield M01 side. The vehicle-mounted camera 1 is then fixed to the bracket 2 when the extension piece 115 is inserted into the engagement hole 2b and the protrusions 114 are fitted into the engagement holes 2a from the inside.

In such a manner, the vehicle-mounted camera 1 is installed so as to be inclined downward in the vertical direction and forward in the horizontal direction along the inner surface of the windshield M01. This allows the amount of protrusion of the vehicle-mounted camera 1 from the windshield M01 to be suppressed to be small, and thus it is advantageous from the viewpoint of ensuing a wider field of view of the driver and effectively using the space in the vehicle.

[Configuration of Each Portion of Vehicle-Mounted Camera 1]

Figure 4:
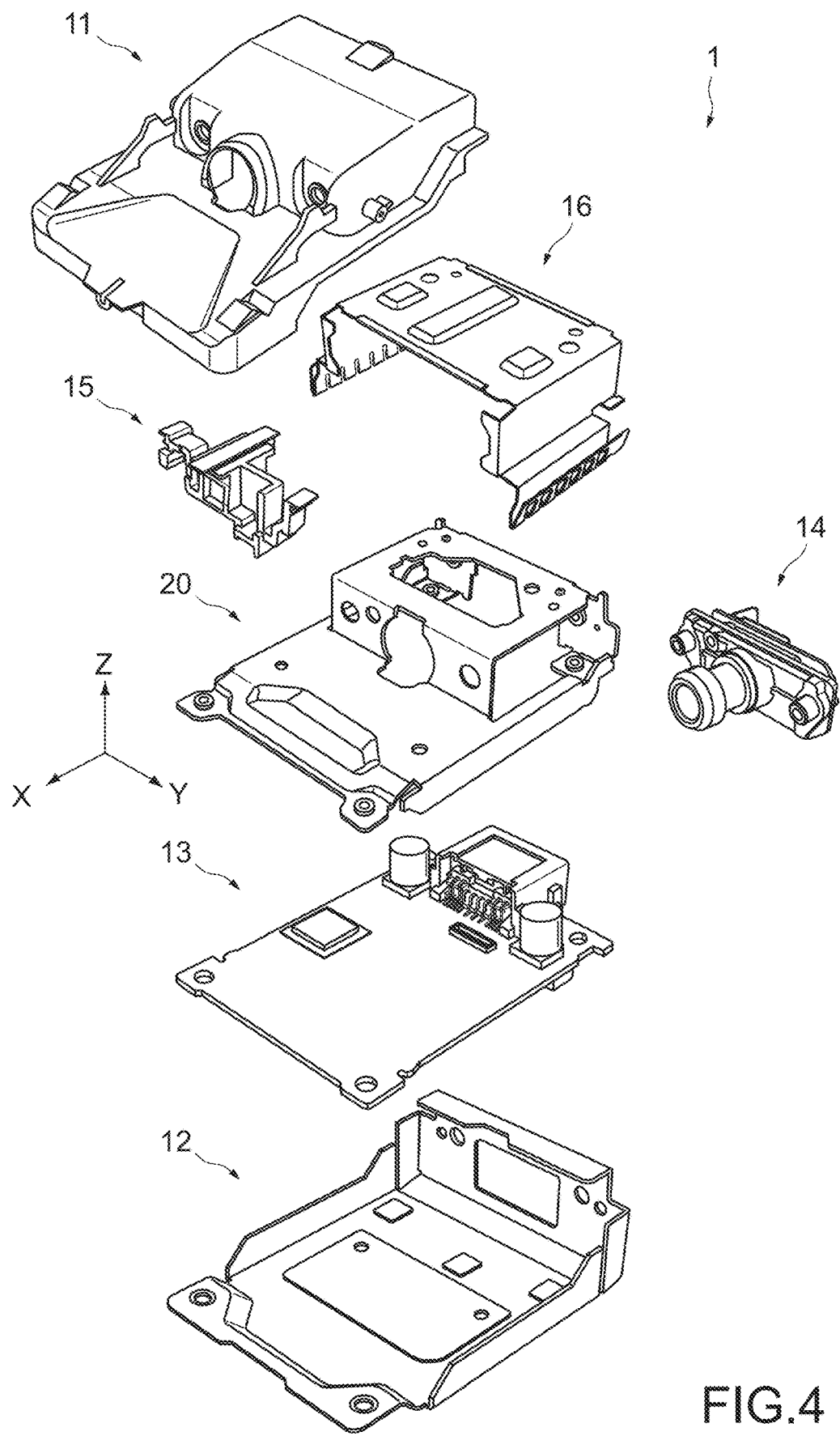
FIG. 4 is an exploded perspective view of the vehicle-mounted camera.

FIG. 4 is an exploded perspective view of the vehicle-mounted camera 1. The vehicle-mounted camera 1 further includes a frame 20, a main board 13, a pressing member 15, and a shield plate 16. The frame 20 forms a skeleton of the vehicle-mounted camera 1 and holds the front case 11, the bottom case 12, the main board 13, the imaging unit 14, the pressing member 15, and the shield plate 16.

Figure 5:
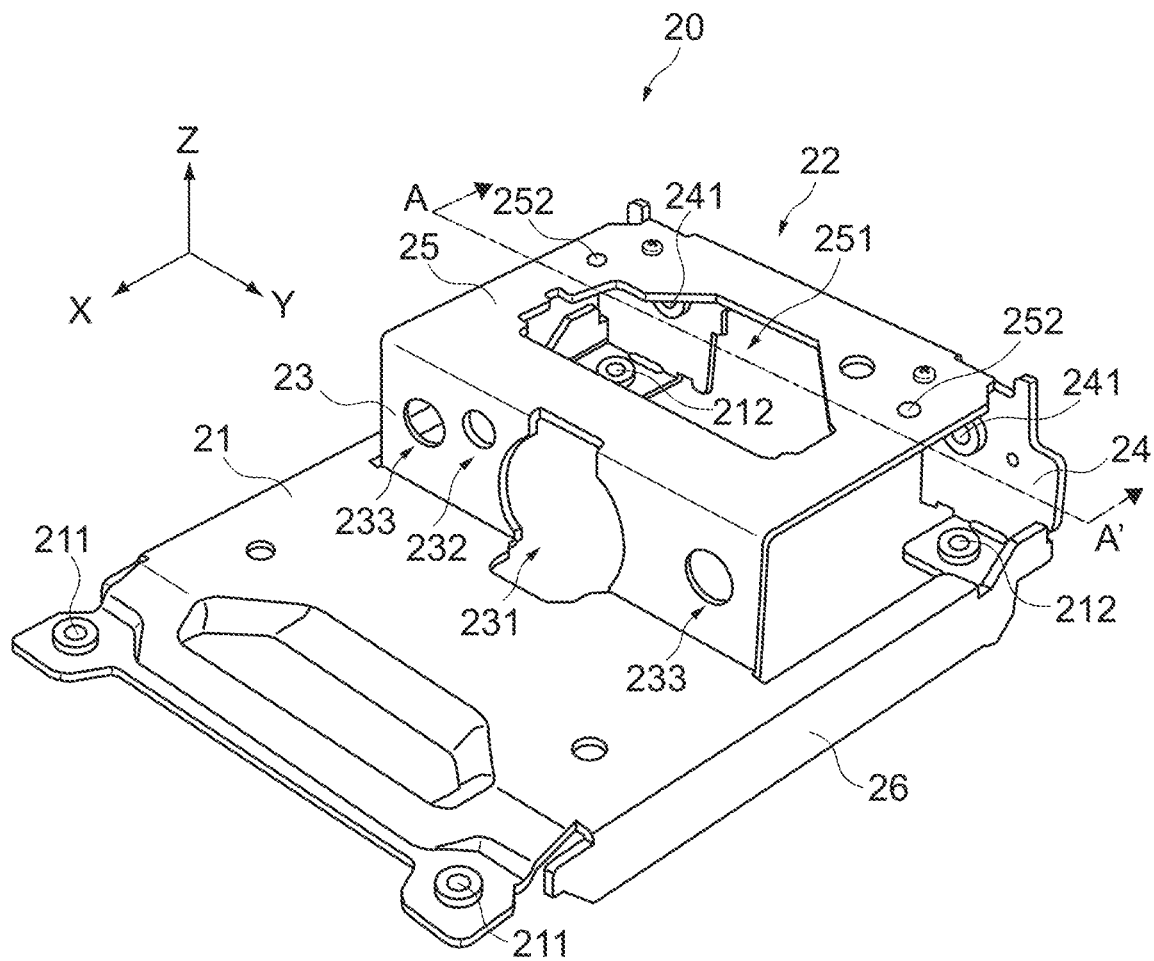
FIG. 5 is a perspective view of a frame of the vehicle-mounted camera.

FIG. 5 is a perspective view of the frame 20. The frame 20 is favorably a sheet metal processed product and is formed, for example, by applying plastic processing to a thin sheet material of metal such as stainless steel. The frame 20 includes a flat portion 21 extending along the X-Y plane, and a raised portion 22 raised upward in the Z-axis direction from the flat portion 21 within the housing portion 112 of the front case 11.

The raised portion 22 includes a front wall portion 23, a rear wall portion 24, and an upper wall portion 25. The front wall portion 23 and the rear wall portion 24 each have a flat plate shape extending along the Y-Z plane and face each other in the X-axis direction. The upper wall portion 25 has a flat plate shape extending along the X-Y plane and interconnects the upper end portions of the front wall portion 23 and the rear wall portion 24 in the Z-axis direction.

The front wall portion 23 includes, in the central portion in the Y-axis direction, a lens hole 231 penetrating in the X-axis direction. The lens hole 231 is disposed adjacent to the rear of the lens hole 113 of the front case 11 in the X-axis direction. The optical unit 141 of the imaging unit 14 is inserted into the lens hole 231 of the frame 20 and the lens hole 113 of the front case 11.

Additionally, the front wall portion 23 includes a through-hole portion 232 penetrating in the X-axis direction at a position adjacent to the lens hole 231. Further, the front wall portion 23 includes a pair of through-hole portions 233 penetrating in the X-axis direction in both end portions of the front wall portion 23 in the Y-axis direction. The through-hole portions 233 are used to fix the imaging unit 14 and the front case 11.

The upper wall portion 25 includes, in the central region, an opening 251 penetrating in the Z-axis direction. The opening 251 is widely opened so as to be accessible to the space within the raised portion 22 from the upper portion of the upper wall portion 25 in the Z-axis direction. Since the pressing member 15 is fitted into the opening 251, the edge of the opening 251 is formed in a shape corresponding to the pressing member 15.

Additionally, the frame 20 includes screw hole portions 211, 212, 241, and 252 for fixing each portion of the vehicle-mounted camera 1. The screw hole portions 211 and 212 are provided in the front and rear regions in the X-axis direction connected to the flat portion 21 and penetrate in the Z-axis direction. The screw hole portions 241 are provided to the rear wall portion 24 and penetrate in the X-axis direction. The screw hole portions 252 are provided to the upper wall portion 25 and penetrate in the Z-axis direction.

More specifically, the screw hole portions 211 are respectively provided at both end portions in the Y-axis direction of the front region of the flat portion 21 in the X-axis direction and are used to fix the main board 13 and the bottom case 12. The screw hole portions 212 are respectively provided at both end portions in the Y-axis direction of the rear region of the flat portion 21 in the X-axis direction and are used to fix the main board 13.

The screw hole portions 241 are respectively provided at both end portions in the Y-axis direction of the rear wall portion 24 and are used to fix the bottom case 12. The screw hole portions 252 are respectively provided at both end portions in the Y-axis direction of the upper wall portion 25 and are used to fix the shield plate 16. Each screw hole portion 211, 212, 241, or 252 is formed in a female screw shape corresponding to a screw member S to be used.

The screw member S to be used for fixing each member to each screw hole portion 211, 212, 241, or 252 can be arbitrarily determined. Typically, the screw member S is a male screw that is configured to be capable of being fastened by being screwed into each screw hole portion 211, 212, 241, or 252 while rotating a screwdriver engaged with the groove formed in the head of the screw member S.

Additionally, the frame 20 includes side plates 26 bent downward in the Z-axis direction from both edge portions of the flat portion 21 in the Y-axis direction. The side plate 26 has a flat plate shape extending along the X-Z plane and elongated in the X-axis direction. The side plate 26 is used to hold the shield plate 16 between itself and a side plate 123 of the bottom case 12, which will be described later.

Figure 6:
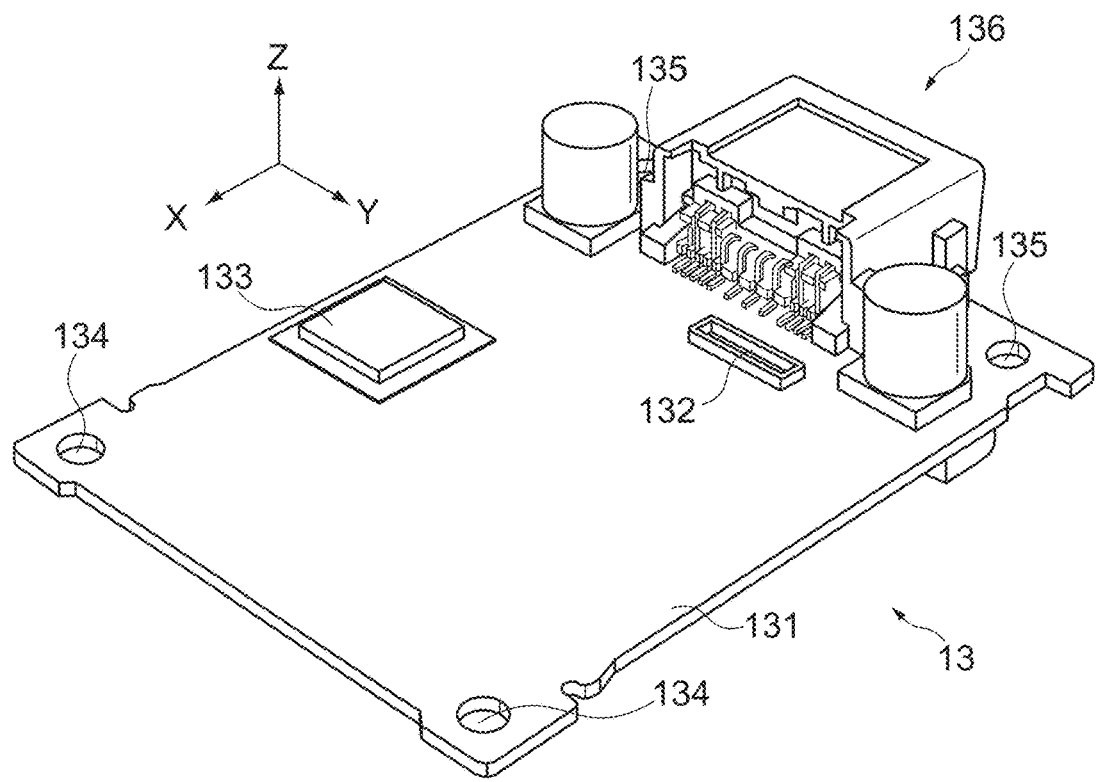
FIG. 6 is a perspective view of a main board of the vehicle-mounted camera.

FIG. 6 is a perspective view of the main board 13. The main board 13 includes a flat plate-shaped base material 131 extending along the X-Y plane. As the base material 131, various ceramic boards, various plastic boards, and the like can be used. The mounting surface of the base material 131 that faces upward in the Z-axis direction is provided with a terminal 132 to be connected to the imaging device board 142 of the imaging unit 14 to be described later.

Additionally, a micro controller unit (MCU) 133 and a power supply unit 136 are provided on the mounting surface of the base material 131. In addition to the above-described structural elements, electronic components necessary for implementing various functions of the vehicle-mounted camera 1 are further mounted on the mounting surface (both surfaces in the Z-axis direction) of the base material 131. Examples of such electronic components include various types of ICs, memories, drivers, and the like.

The base material 131 includes through-hole portions 134 and 135 penetrating in the Z-axis direction. The through-hole portions 134 are respectively provided at both end portions in the Y-axis direction of the front end portion in the X-axis direction and are fixed to the screw hole portions 211 of the frame 20. The through-hole portions 135 are respectively provided at both end portions in the Y-axis direction of the rear end portion in the X-axis direction and are fixed to the screw hole portions 212 of the frame 20.

Figure 7:
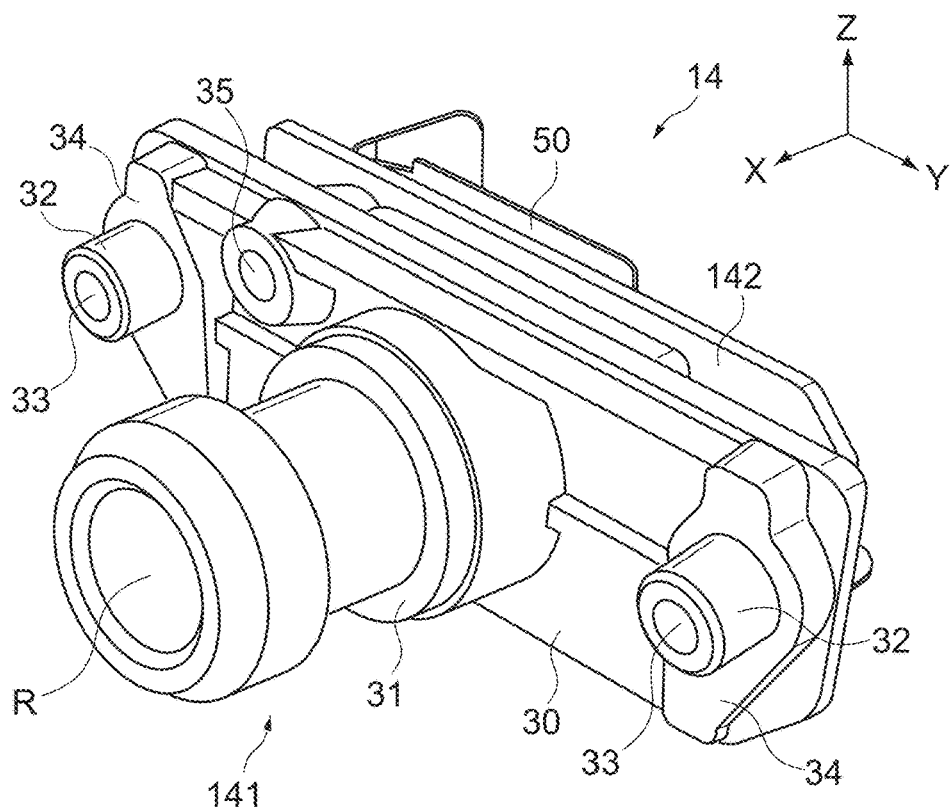
FIG. 7 is a perspective view of an imaging unit of the vehicle-mounted camera.

FIG. 7 is a perspective view of the imaging unit 14. The imaging unit 14 includes a holder 30, the optical unit 141, the imaging device board 142, and a flexible board 50. The holder 30 holds the optical unit 141 and the imaging device board 142. The flexible board 50 is connected to the imaging device board 142.

The optical unit 141 includes optical components such as a lens R having a common optical axis, and has a cylindrical shape extending along the optical axis direction. The holder 30 includes a holding portion 31 for holding the optical unit 141. The holding portion 31 is positioned at the center portion in the Y-axis direction and is configured as a substantially circular opening portion that holds the outer peripheral surface of the rear end portion of the optical unit 141 over the entire circumference without a gap.

Additionally, the holder 30 includes a pair of columnar portions 32 and a pair of screw hole portions 33. The columnar portions 32 are respectively provided at both end portions in the Y-axis direction of the front of the holder 30 facing forward in the X-axis direction and are formed in a columnar shape protruding forward in the X-axis direction. Each of the screw hole portions 33 is formed rearward from the distal end portion of each columnar portion 32 facing forward in the X-axis direction.

Further, the holder 30 includes a pair of regulating surfaces 34. Each of the regulating surfaces 34 extends around the rear end portion of each columnar portion 32 in the X-axis direction. Each regulating surface 34 is located on a common plane. In addition, the holder 30 further includes a screw hole portion 35 formed from the front side toward the rear in the Z-axis direction. The screw hole portion 35 is temporarily fixed to the through-hole portion 232 of the frame 20.

The columnar portions 32 and the regulating surfaces 34 of the holder 30 are used for positioning the imaging unit 14 and the front case 11 with respect to the frame 20. Therefore, the holder 30 needs to be formed in an accurate shape for accurate positioning of the imaging unit 14 and the front case 11. For that reason, a die-cast product of metal such as aluminum is favorably used as the holder 30. In this case, a cut surface of a metal die-cast is favorably used as the regulating surface 34 of the holder 30. Additionally, a resin molded product with high accuracy can also be used as the holder 30.

The imaging device board 142 has a flat plate shape along a plane orthogonal to the optical axis of the optical unit 141 and is disposed on the back surface of the holder 30. An imaging device is mounted on the mounting surface of the imaging device board 142 that faces forward in the X-axis direction. Thus, the light incident on the optical unit 141 from the external environment in front of the vehicle-mounted camera 1 can be made incident on the imaging device.

The imaging device mounted on the imaging device board 142 is not limited to a specific type. As the imaging device, for example, a charge coupled device (CCD) or a complementary metal oxide semiconductor (CMOS) can be used. As the base material of the imaging device board 142, various ceramic boards, various plastic boards, and the like can be used.

Additionally, in addition to the imaging device, other various components necessary for implementing the function of the imaging unit 14 can be mounted on the imaging device board 142. For example, a processing unit capable of performing image processing or the like can be mounted on the imaging device board 142. The flexible board 50 connects the imaging device board 142 and the terminal 132 of the main board 13 to each other.

Figure 8:
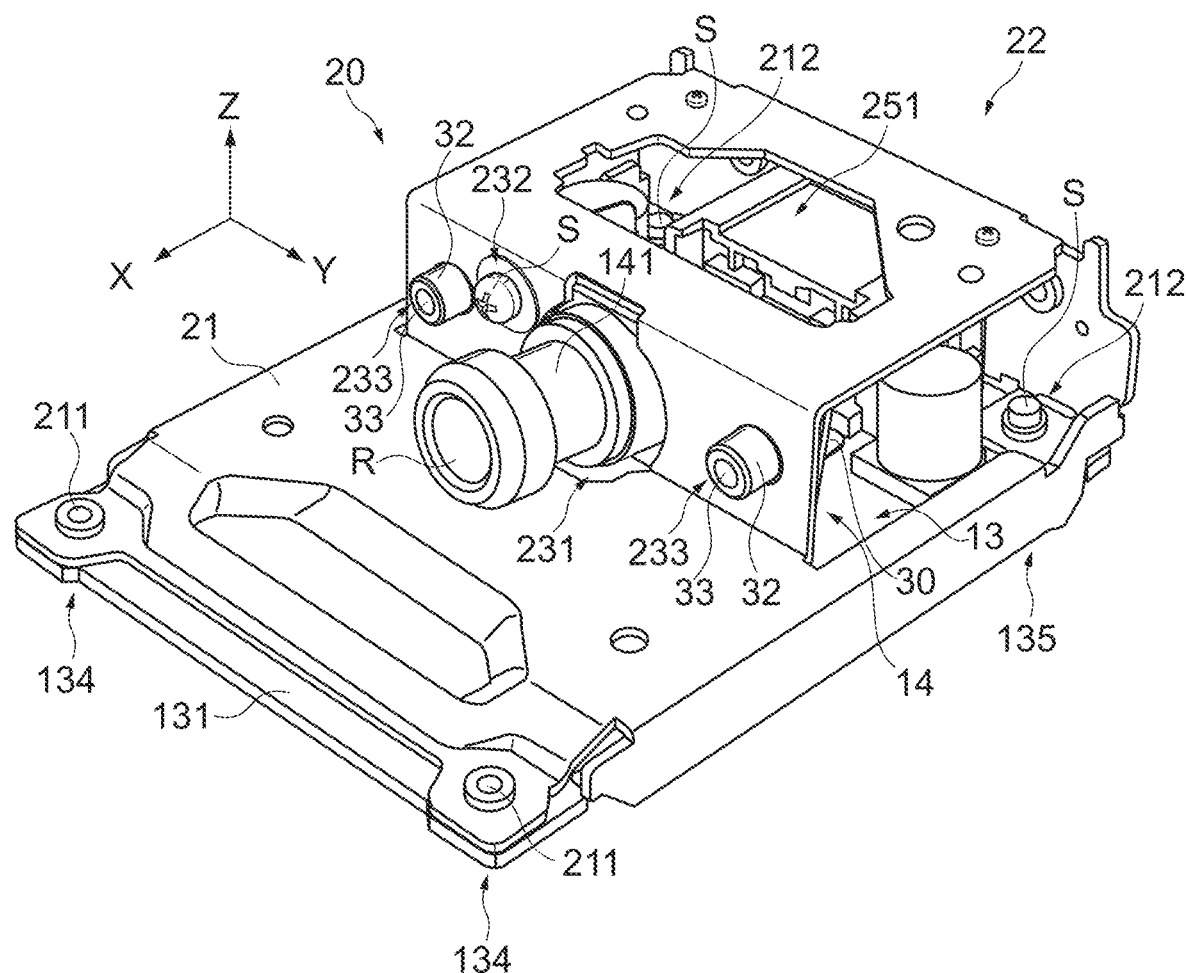
FIG. 8 is a perspective view showing a state of attaching the main board and the imaging unit of the vehicle-mounted camera to the frame.

FIG. 8 is a perspective view showing a state of attaching the main board 13 and the imaging unit 14 to the frame 20. The imaging unit 14 is attached to the front wall portion 23 of the frame 20 from the rear in the X-axis direction. At that time, the optical unit 141 is inserted into the lens hole 231 forward in the X-axis direction, and the columnar portions 32 are inserted into the through-hole portions 233 forward in the X-axis direction.

The imaging unit 14 is temporarily fixed to the frame 20 by fastening the screw member S, which is inserted into the through-hole portion 232 of the frame 20 from the front in the X-axis direction, to the screw hole portion 35 of the holder 30. Note that the vehicle-mounted camera 1 as a finished product does not need the screw member S for temporarily fixing the imaging unit 14 to the frame 20, but the screw member S may be left for the sake of convenience of the manufacturing process.

The main board 13 is fixed to the frame 20 by fastening the screw members S, which are inserted into the through-hole portions 135 from below in the Z-axis direction, to the screw hole portions 212 of the frame 20. Note that the through-hole portions 134 of the main board 13 are screwed to the screw hole portions 211 of the frame 20 in a subsequent step, and are thus not fixed to the frame 20 at this stage.

The flexible board 50 of the imaging unit 14 is connected to the terminal 132 of the main board 13 in the state shown in FIG. 8. The flexible board 50 is accessible through the opening 251 of the frame 20 from above in the Z-axis direction. Further, in the vehicle-mounted camera 1, the pressing member 15 is used for fixing the flexible board 50 onto the main board 13.

Figure 9:
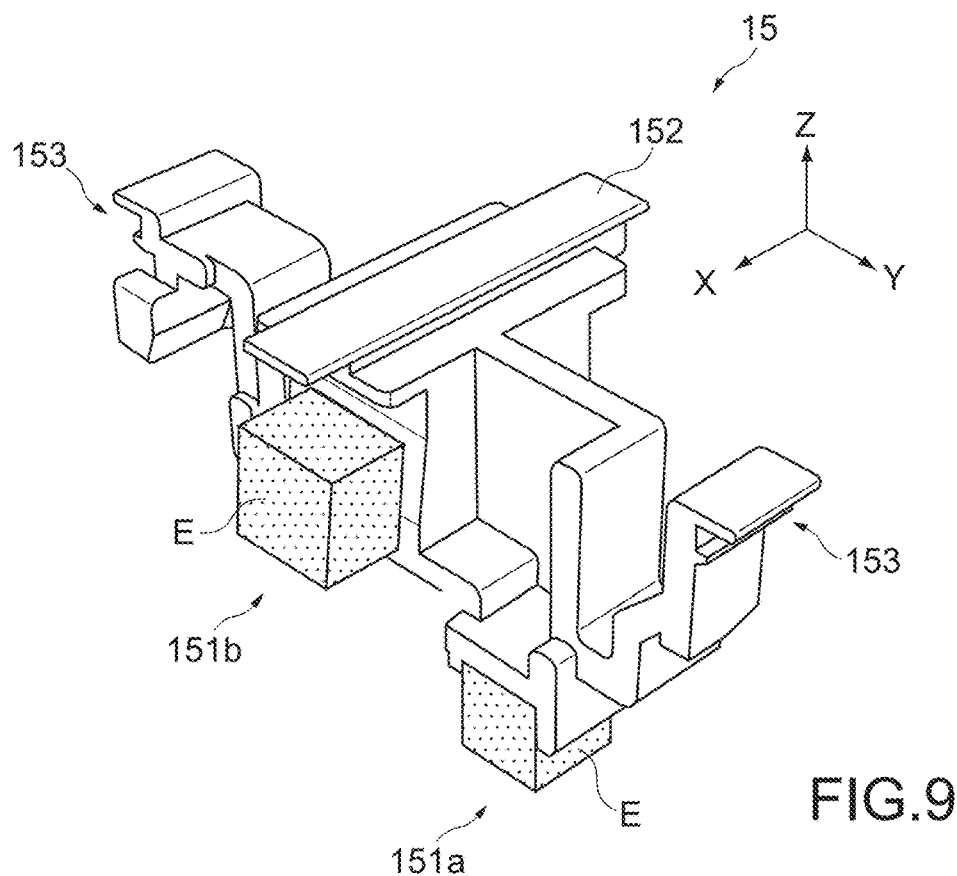
FIG. 9 is a perspective view of a pressing member of the vehicle-mounted camera.

FIG. 9 is a perspective view of the pressing member 15. The pressing member 15 is formed of, for example, a resin material. The pressing member 15 includes a pressing portion 151a facing downward in the Z-axis direction and a pressing portion 151b facing forward in the X-axis direction. A cushion material E is attached to each of the pressing portions 151a and 151b. The pressing member 15 presses one connection terminal portion of the flexible board 50 against the main board 13 by the pressing portion 151a, and presses the other connection terminal portion of the flexible board 50 against the imaging device board 142 by the pressing portion 151b. As a result, the flexible board 50 is fixed to the main board 13 and the imaging device board 142.

The pressing member 15 includes an engagement plate 152 and engagement pieces 153 provided at the upper portion in the Z-axis direction. The engagement plate 152 has a flat plate shape extending along the X-Y plane and elongated in the X-axis direction. The engagement pieces 153 are provided at both end portions in the Y-axis direction. Each of the engagement pieces 153 is formed of a pair of protruding pieces that are provided at an interval in the Z-axis direction and protrude outward in the Y-axis direction.

Figure 10:
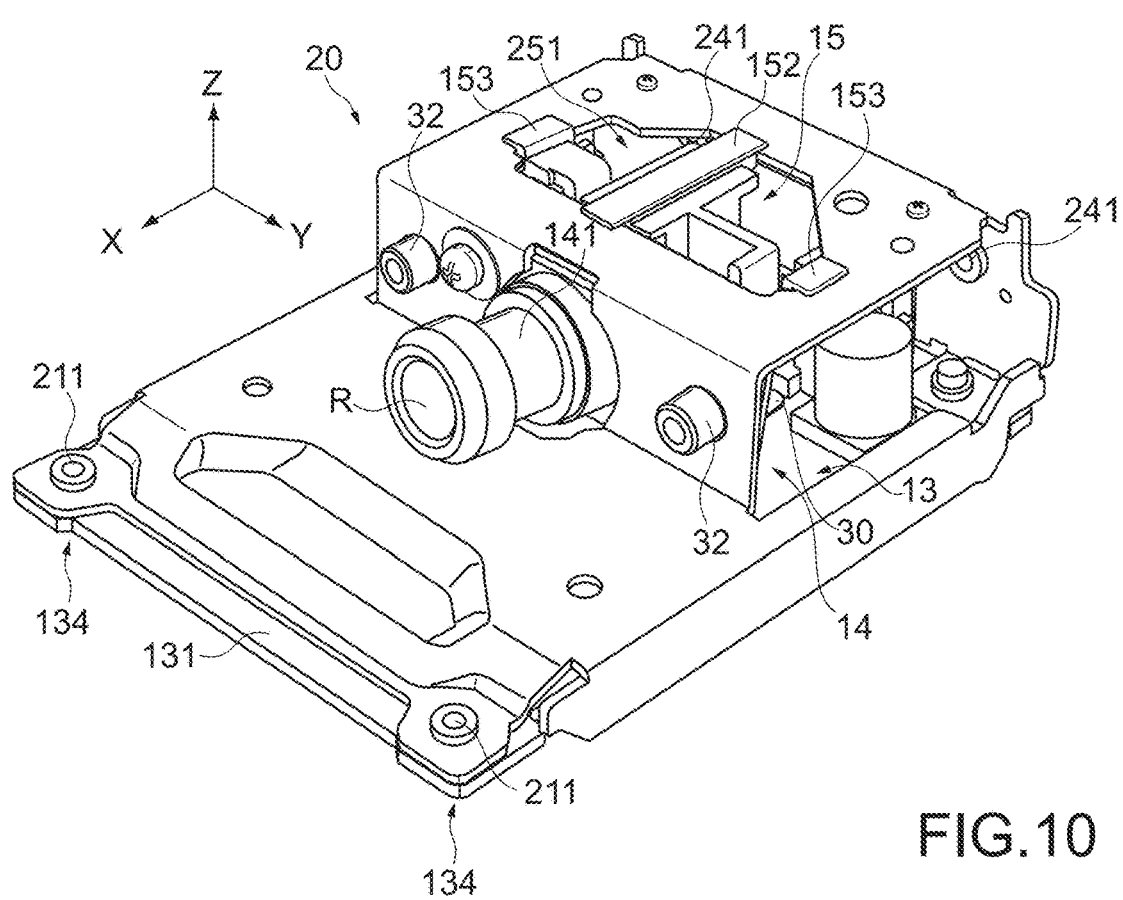
FIG. 10 is a perspective view showing a state of attaching the pressing member to the frame shown in FIG. 8.

FIG. 10 is a perspective view showing a state of attaching the pressing member 15 to the frame 20 shown in FIG. 8. The engagement plate 152 is engaged with the edge of the opening 251 from the upper side in the Z-axis direction and is stretched over the opening 251 in the X-axis direction. The engagement pieces 153 are fitted into the opening 251, i.e., sandwich the edge of the opening 251 with the pairs of protruding pieces from above and below in the Z-axis direction.

Thus, the pressing member 15 is fixed to the frame 20. The pressing member 15 is configured such that, in this state, the pressing portions 151a and 152b appropriately press the respective connection terminal portions of the flexible board 50. Thus, in the vehicle-mounted camera 1, the connection between the imaging device board 142 and the main board 13 by the flexible board 50 can be more reliably held.

Figure 11:
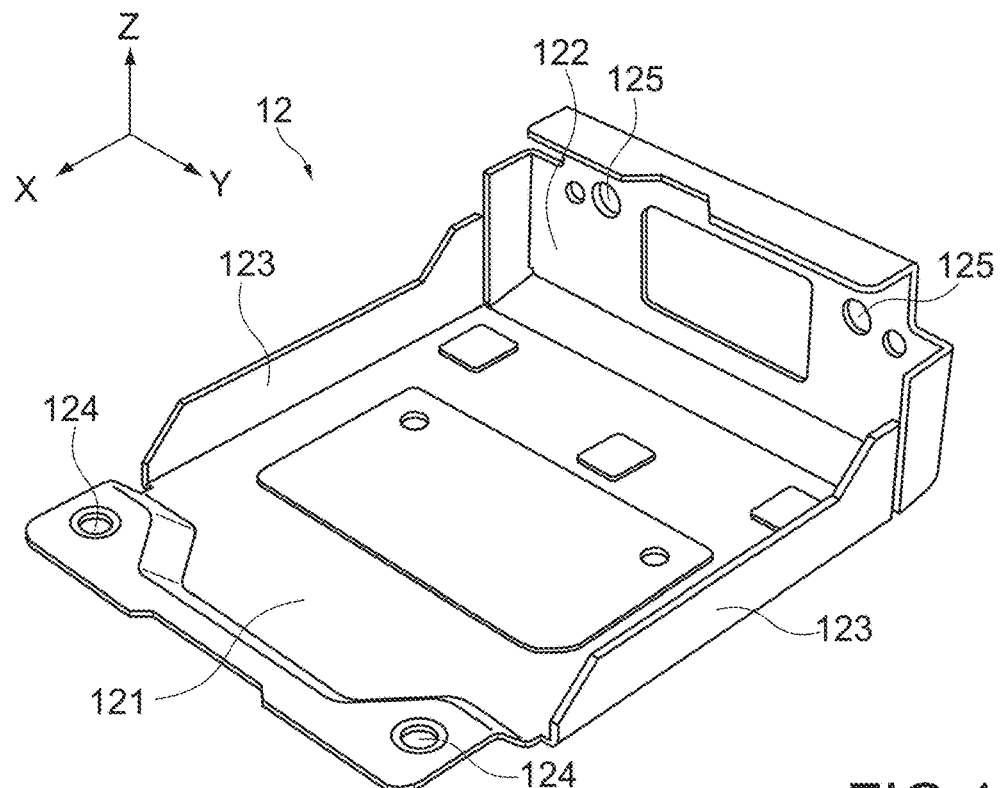
FIG. 11 is a perspective view of a bottom case of the vehicle-mounted camera.

FIG. 11 is a perspective view of the bottom case 12. The bottom case 12 is formed, for example, by applying plastic processing to a thin plate material of metal such as aluminum. The bottom case 12 includes a bottom plate 121 that constitutes the bottom surface of the vehicle-mounted camera 1, and a back plate 122 and side plates 123 that are bent from the edge portion of the bottom plate 121.

The bottom plate 121 has a planar plate shape extending along the X-Y plane. The back plate 122 has a flat plate shape extending along the Y-Z plane and extends upward in the Z-axis direction from a rear end portion of the bottom plate 121 in the X-axis direction. The side plates 123 each have a flat plate shape extending along the X-Z plane and extend upward in the Z-axis direction from both end portions of the bottom plate 121 in the Y-axis direction.

The bottom plate 121 includes through-hole portions 124 penetrating in the Z-axis direction, which are respectively formed at both end portions in the Y-axis direction of the front end portion in the X-axis direction. The back plate 122 includes through-hole portions 125 penetrating in the X-axis direction, which are respectively formed at both end portions in the Y-axis direction. Both the through-hole portions 124 and 125 are used to fix the bottom case 12 to the frame 20.

Figure 12:
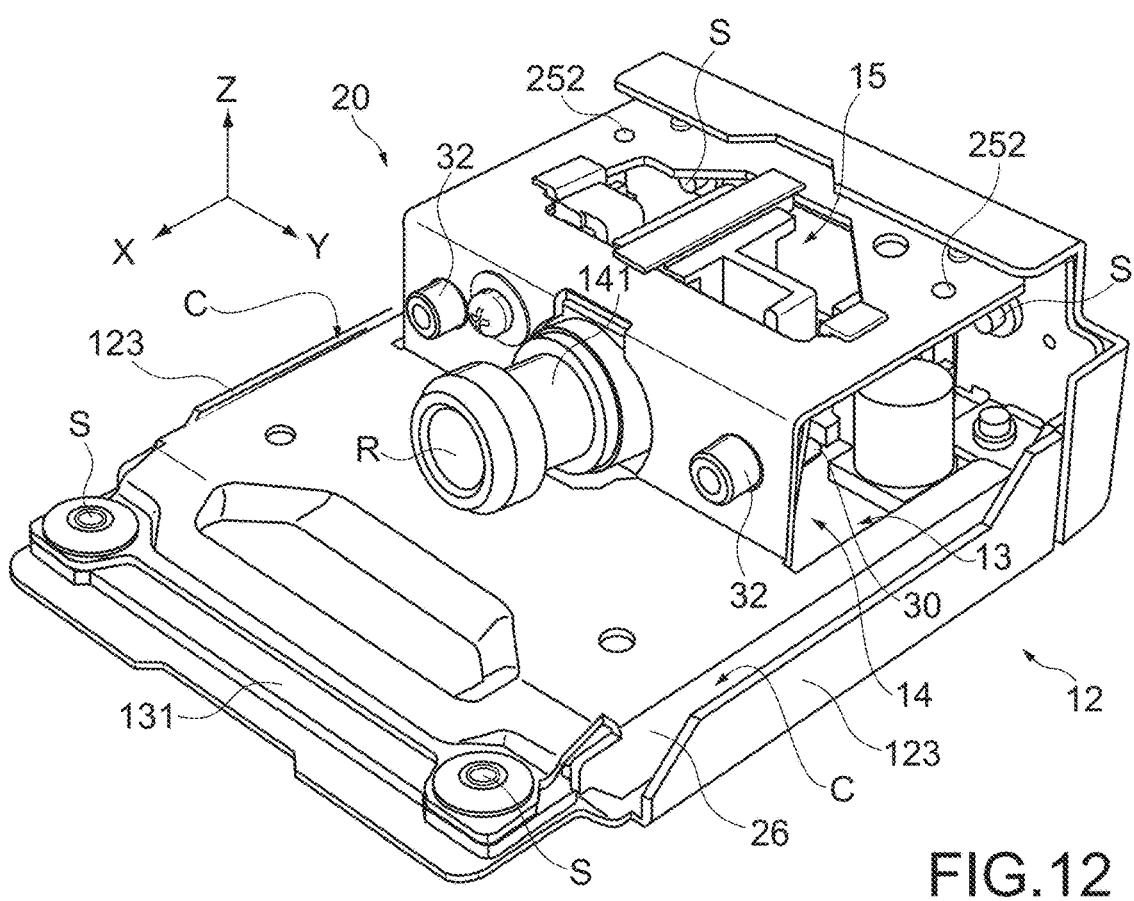
FIG. 12 is a perspective view showing a state of attaching the bottom case to the frame shown in FIG. 10.

FIG. 12 is a perspective view showing a state of attaching the bottom case 12 to the frame 20 shown in FIG. 10. In the state shown in FIG. 12, the through-hole portion 124 of the bottom case 12, the through-hole portion 134 of the main board 13, and the screw hole portion 211 of the frame 20 overlap in the Z-axis direction to form a continuous through hole.

The bottom case 12 is fixed to the frame 20 by fastening the screw members S, which are inserted into the through-hole portions 125 from the rear in the X-axis direction, to the screw hole portions 241 of the frame 20. Additionally, the bottom case 12 is fixed to the frame 20 by fastening the screw members S, which are inserted into the through-hole portions 124 and 134 from below in the Z-axis direction, to the screw hole portions 211 of the frame 20.

The main board 13 sandwiched between the frame 20 and the bottom case 12 is also fixed to the frame 20 by the fastening of the screw members S to the screw hole portions 211 of the frame 20. Thus, the bottom case 12 and the main board 13 are stably fixed to the frame 20 in two spots each in the front and rear in the X-axis direction.

The side plate 26 of the frame 20 is disposed inside the side plate 123 of the bottom case 12 in the Y-axis direction. Thus, a gap C in the Y-axis direction is formed between the side plate 26 of the frame 20 and the side plate 123 of the bottom case 12. The shield plate 16 is incorporated in the gap C between the side plates 26 and 123.

Figure 13:
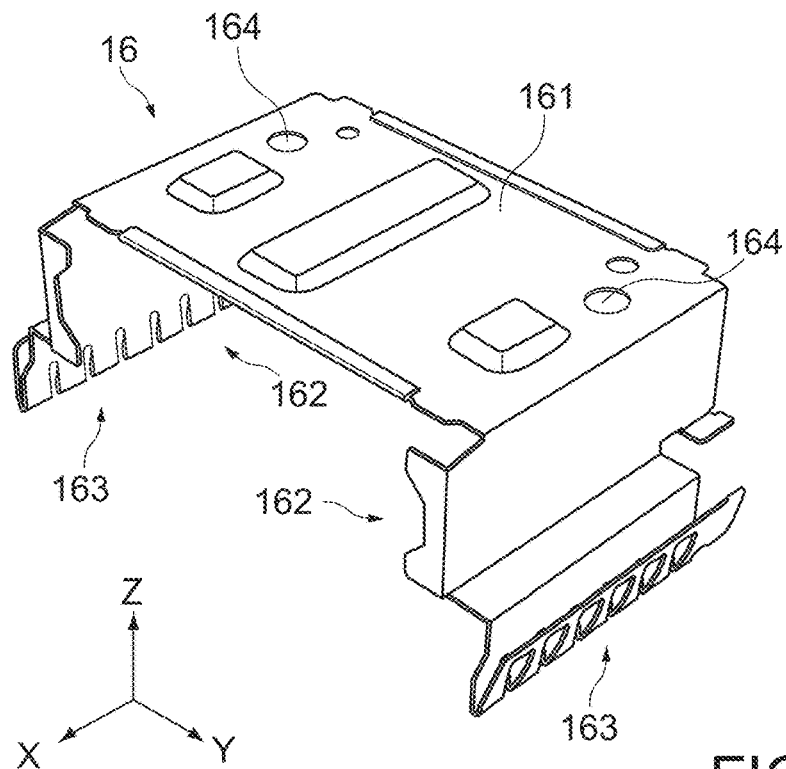
FIG. 13 is a perspective view of a shield plate of the vehicle-mounted camera.

FIG. 13 is a perspective view of the shield plate 16. The shield plate 16 is formed, for example, by adding plastic processing to a thin plate material of metal such as stainless steel. The shield plate 16 includes a top plate 161, side plates 162, and leaf spring portions 163. The shield plate 16 has a substantially U-shaped cross section along the Y-Z plane.

The top plate 161 extends along the X-Y plane. The side plates 162 extend along the X-Z plane and extend downward in the Z-axis direction from both end portions of the top plate 161 in the Y-axis direction. The top plate 161 covers the raised portion 22 of the frame 20 from above in the Z-axis direction and closes the opening 251. The side plates 162 cover the space within the raised portion 22 of the frame 20 from both sides in the Y-axis direction.

The top plate 161 includes through-hole portions 164 penetrating in the Z-axis direction, which are formed respectively at both end portions in the Y-axis direction. The leaf spring portions 163 extend downward in the Z-axis direction further from the respective side plates 162 and are bent in a V-shape outward in the Y-axis direction. Both the through-hole portions 164 and the leaf spring portions 163 are used to fix the shield plate 16 to the frame 20.

Figure 14:
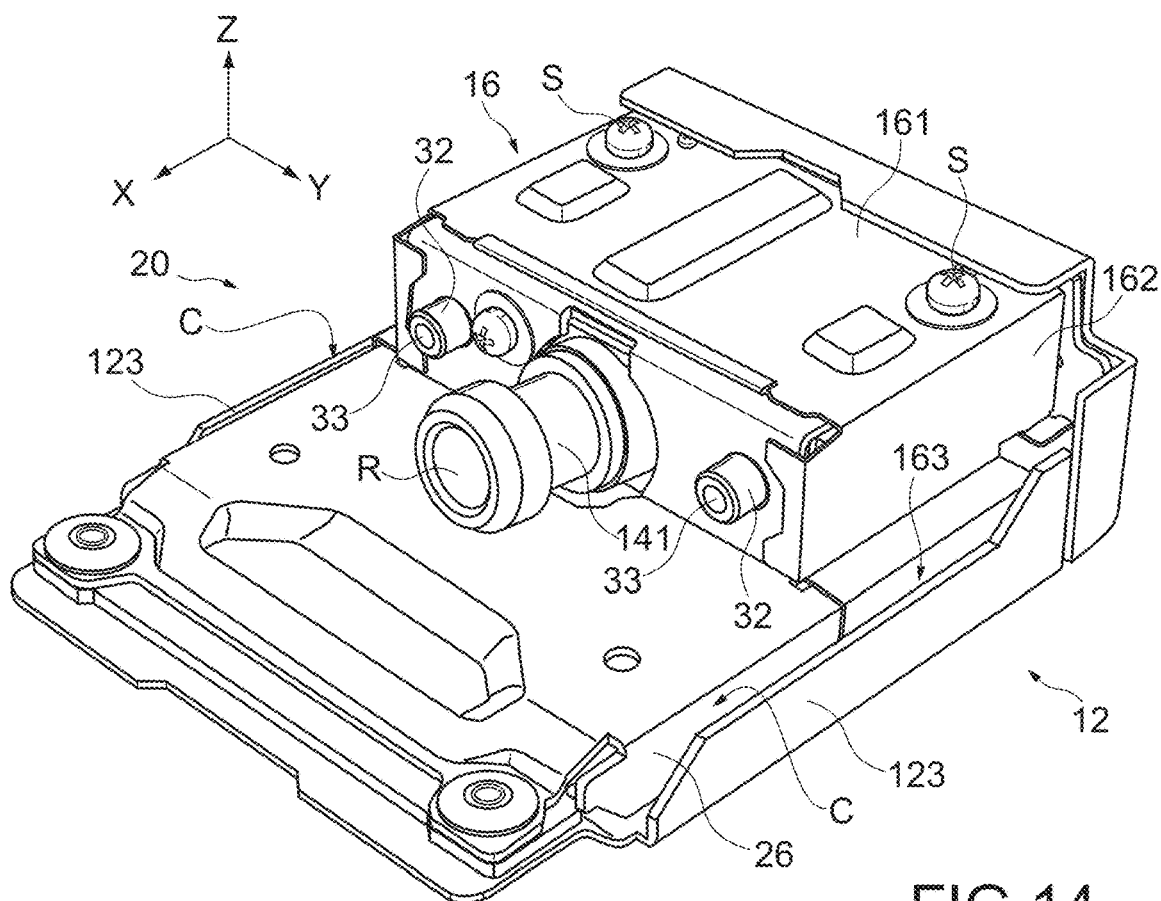
FIG. 14 is a perspective view showing a state of attaching the shield plate to the frame shown in FIG. 12.

FIG. 14 is a perspective view showing a state of attaching the shield plate 16 to the frame 20 shown in FIG. 12. In the state shown in FIG. 14, the leaf spring portion 163 is incorporated in the gap C between the side plates 26 and 123. Thus, the leaf spring portion 163 is fixed while being sandwiched between the side plates 26 and 123 in a state of being compressively deformed in the Y-axis direction.

Additionally, the shield plate 16 is fixed to the frame 20 by fastening the screw members S, which are inserted into the through-hole portions 164 from above in the Z-axis direction, to the screw hole portions 252 of the frame 20. Thus, the electronic components within the raised portion 22 are electromagnetically shielded from the external environment by the frame 20, the shield plate 16, and the bottom case 12 that are formed of metal.

Figure 15:
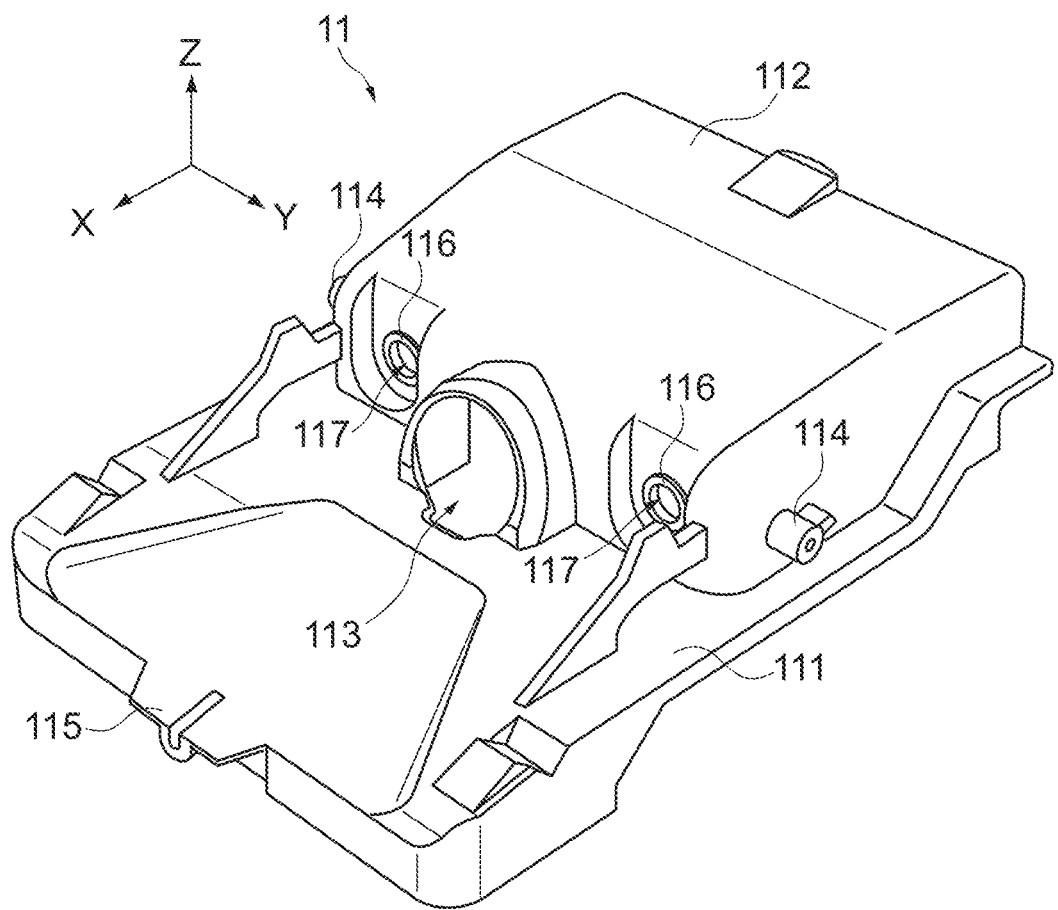
FIG. 15 is a perspective view of a front case of the vehicle-mounted camera.

FIG. 15 is a perspective view of the front case 11. The housing portion 112 includes a pair of boss portions 116 respectively protruding in the X-axis direction at both end portions of the front in the Y-axis direction. A pair of through-hole portions 117 penetrating in the X-axis direction are formed in the pair of boss portions 116. The through-hole portions 117 are used to fix the front case 11 to the frame 20.

The front case 11 is attached to the frame 20 shown in FIG. 14. The front case 11 is placed on the bottom case 12. At that time, the optical unit 141 of the imaging unit 14 is inserted into the lens hole 113 from the rear in the X-axis direction, and the columnar portions 32 of the holder 30 of the imaging unit 14 are inserted into the respective through-hole portions 117 from the rear in X-axis direction.

The screw members S inserted into the through-hole portions 117 from the front in the X-axis direction are then fastened to the screw hole portions 33 formed in the columnar portions 32 of the holder 30. Thus, the frame 20 is sandwiched between the front case 11 and the regulating surfaces 34 of the holder 30, and thus the imaging unit 14 and the front case 11 are fixed to the frame 20.

As described above, the vehicle-mounted camera 1 shown in FIG. 2 is completed. In the state shown in FIG. 2, positioning is performed by the pair of columnar portions 32 of the holder 30 to be inserted into the through-hole portions 233 of the frame 20 and the through-hole portions 117 of the front case 11. Thus, in the vehicle-mounted camera 1, it is possible to direct the optical axis of the optical unit 141 of the imaging unit 14 in an accurate direction.

The screw members S used for fixing the front case 11 and the holder 30 to the frame 20 are arbitrarily selectable from male screws each having a head engageable with the boss portion 116. As the screw member S, in addition to a cross-slot screw and a slotted screw having a groove formed in the head, for example, a hexagonal bolt having the head of a hexagonal shape is available.

As described above, the front case 11 is fixed to the frame 20 only in the through-hole portions 117 of the two boss portions 116. Thus, in the vehicle-mounted camera 1, stress is hardly applied to the frame 20 and the imaging unit 14 when the front case 11 is attached. Therefore, in the vehicle-mounted camera 1, the optical axis of the optical unit 141 of the imaging unit 14 is hardly shifted.

Additionally, it is not necessary to provide a screw hole portion in the front case 11. Thus, in the vehicle-mounted camera 1, the front case 11 can be a resin molded product.

This makes it possible to achieve cost reduction and weight reduction in the vehicle-mounted camera 1. In addition, the through-hole portions 117 of the boss portions 116 to be positioned by the columnar portions 32 of the holder 30 can be formed in an accurate shape.

In the vehicle-mounted camera 1 according to this embodiment, the fixing structure for fixing the imaging unit 14 and the front case 11 to the frame 20 is configured to be capable of achieving both of miniaturization and high functionality. Hereinafter, details of the fixing structure of the imaging unit 14 and the front case 11 with respect to the frame 20 in the vehicle-mounted camera 1 will be described.

[Fixing Structure of Imaging Unit 14 and Front Case 11]

Figure 16:
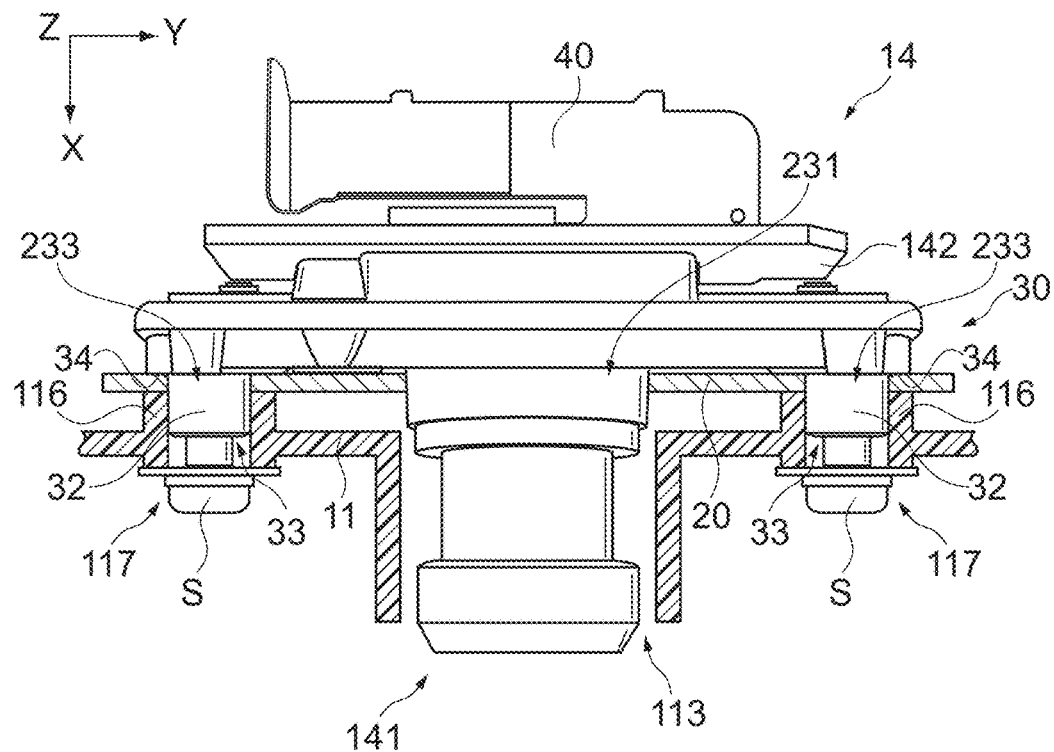
FIG. 16 is a plan view of the imaging unit.
Figure 17:
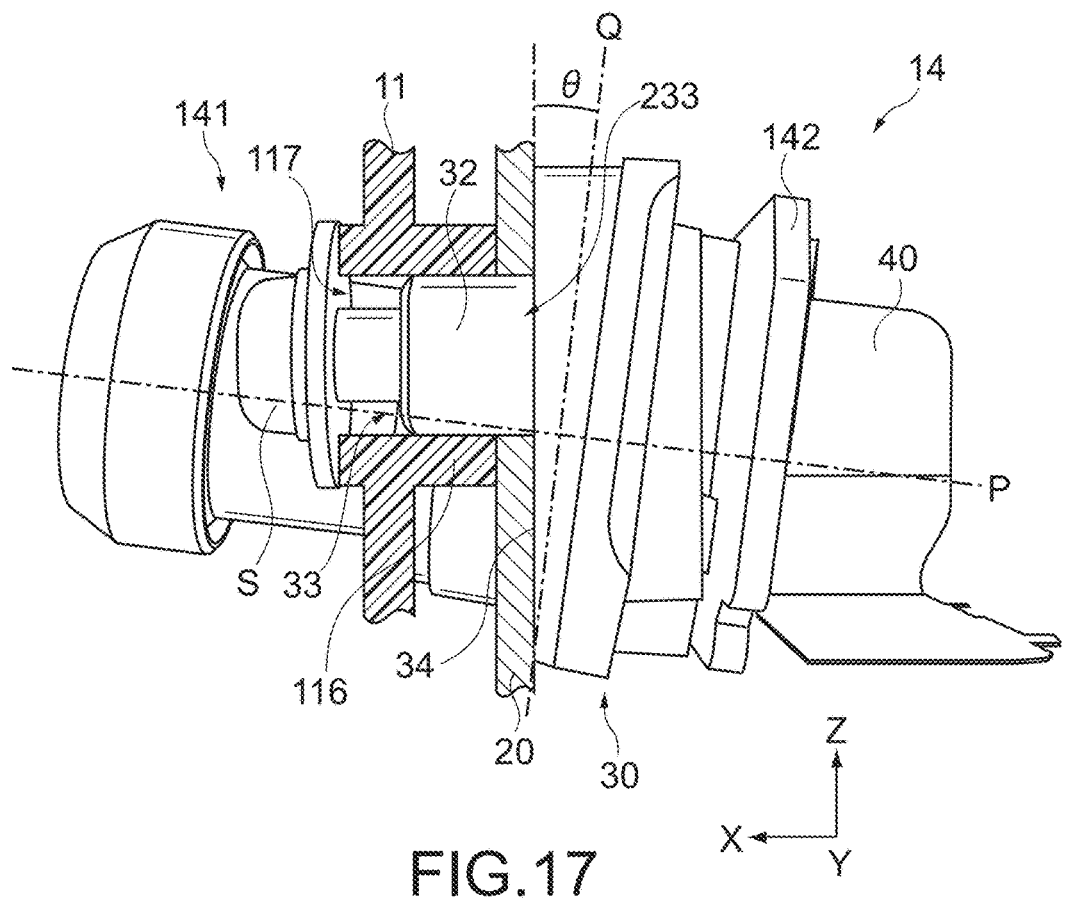
FIG. 17 is a side view of the imaging unit.

FIG. 16 is a plan view of the imaging unit 14 when viewed from above in the Z-axis direction. FIG. 17 is a side view of the imaging unit 14 when viewed from the side in the Y-axis direction. FIGS. 16 and 17 show a state in which the imaging unit 14 is fixed to the frame 20 together with the front case 11. FIGS. 16 and 17 schematically show the frame 20 and the front case 11 as a partial cross section.

As shown in FIGS. 16 and 17, the columnar portion 32 of the holder 30 is inserted from the rear in the X-axis direction of the through-hole portion 233 of the frame 20 to the middle of the through-hole portion 117 of the boss portion 116 of the front case 11. The regulating surface 34 of the holder 30 is restricted along the Y-Z plane by the back surface facing the rear in the X-axis direction of the front wall portion 23 of the frame 20.

The screw member S fastened to the screw hole portion 33 of the holder 30 is engaged with the boss portion 116 of the front case 11 from the front in the X-axis direction. Thus, the frame 20 and the boss portion 116 of the front case 11 are sandwiched between the head of the screw member S and the regulating surface 34 of the holder 30, and the front case 11 and the holder 30 are fixed to the frame 20.

The through-hole portion 233 of the frame 20 and the through-hole portion 117 of the front case 11 are each formed in a circular shape having substantially no gap with the outer peripheral surface of the columnar portion 32 of the holder 30. Thus, the frame 20 and the front case 11 are accurately positioned by the columnar portion 32 of the holder 30.

In such a manner, in the vehicle-mounted camera 1, the frame 20, the imaging unit 14, and the front case 11 are collectively positioned with reference to the columnar portion 32 of the holder 30. Therefore, in the vehicle-mounted camera 1, the relative positional deviation of the frame 20, the imaging unit 14, and the front case 11 hardly occurs, and it is possible to direct an optical axis P of the optical unit 141 in an accurate direction.

Additionally, in the fixing structure according to this embodiment, the screw member S screwed into the screw hole portion 33 of the columnar portion 32 does not penetrate the holder 30 rearward in the X-axis direction. Thus, in such a fixing structure, the screw member S does not protrude at the rear of the holder 30 in the X-axis direction. Therefore, in the vehicle-mounted camera 1, it is possible to effectively use the space on the back surface side of the holder 30.

For example, as shown in FIG. 16, in the vehicle-mounted camera 1, the imaging device board 142 can be extended to a region facing at least one of the screw hole portions 33 on the back surface of the holder 30. Thus, in the vehicle-mounted camera 1, the mounting surface capable of mounting electronic components or the like of the imaging device board 142 can be enlarged without increasing the size of the holder 30.

Additionally, in the region facing the screw hole portion 33 on the back surface of the holder 30, electronic components or the like other than the imaging device board 142 can be disposed even when the imaging device board 142 is not disposed. Thus, in the vehicle-mounted camera 1, the high functionality using new electronic components or the like can be achieved without increasing the size.

Additionally, as described with reference to FIG. 3 above, the vehicle-mounted camera 1 according to this embodiment is installed so as to be inclined downward in the vertical direction and forward in the horizontal direction along the inner surface of the windshield M01. In contrast to this, the vehicle-mounted camera 1 is configured to be capable of bringing the direction of the optical axis P of the optical unit 141 close to being horizontal even if the vehicle-mounted camera 1 is inclined downward in the vertical direction as a whole.

More specifically, as shown in FIG. 17, in the vehicle-mounted camera 1, the direction of the optical axis P of the optical unit 141 is inclined upward in the Z-axis direction and forward in the X-axis direction. Therefore, the inclination downward in the vertical direction of the vehicle-mounted camera 1 itself is canceled, and the direction of the optical axis P of the optical unit 141 is brought close to being horizontal. This makes it possible to obtain an appropriate camera image. Eventually, it is possible to image the external environment in front of the automobile M as far as possible.

In the vehicle-mounted camera 1, the inclination of the optical axis P of the optical unit 141 with respect to the X-axis is equal to the inclination of the regulating surface 34 with respect to the orthogonal plane Q that is the plane orthogonal to the optical axis P. Thus, in the vehicle-mounted camera 1, an angle $\theta$ of the regulating surface 34 with respect to the orthogonal plane Q is adjusted, and thus the inclination of the optical axis P of the optical unit 141 with respect to the X-axis can be controlled.

That is, in the vehicle-mounted camera 1, only changing the angle $\theta$ of the regulating surface 34 of the holder 30 with respect to the orthogonal plane Q makes it possible to change the direction of the optical axis P of the optical unit 141. Therefore, the vehicle-mounted camera 1 can be used in a wide variety of automobiles M having different inclinations of the windshield M01 by replacing only the holder 30 in accordance with the inclination of the windshield M01. That is, if the angle $\theta$ is set in accordance with the vehicle type of the automobile M (i.e., in accordance with the inclination of the windshield M1), a configuration to obtain an appropriate camera image can be achieved without redesigning the entire vehicle-mounted camera 1.

Additionally, in the vehicle-mounted camera 1, since the direction of the optical axis P can be changed in accordance with the angle $\theta$ of the regulating surface 34 of the holder 30 with respect to the orthogonal plane Q, the vehicle-mounted camera 1 can be manufactured at a horizontal posture with the Z-axis direction as the vertical direction consistently also in a configuration having a different inclination of the optical axis P of the optical unit 141.

Note that, in the vehicle-mounted camera 1, it is necessary that the mounting surface of the imaging device board 142 on which an imaging device is to be mounted is orthogonal to the optical axis P of the optical unit 141. Thus, in the vehicle-mounted camera 1, the back surface of the holder 30 to which the imaging device board 142 is to be attached is favorably formed in parallel with the orthogonal plane Q orthogonal to the optical axis P of the optical unit 141.

Additionally, in the vehicle-mounted camera 1 according to this embodiment, it is favorable that the screw hole portion 33 of the holder 30 does not penetrate the holder 30 rearward in the X-axis direction. As a result, foreign matter such as chips generated when the screw member S is screwed into the screw hole portion 33 can be prevented from being mixed into the space within the raised portion 22 of the frame 20.

Thus, in the vehicle-mounted camera 1, it is possible to prevent a problem due to contamination of foreign matter into the space within the raised portion 22, such as an operation failure of the electric circuit. From the similar viewpoint, the vehicle-mounted camera 1 has a structure for preventing contamination of foreign matter into the space within the raised portion 22, which is associated with the fastening of the screw members S to the frame 20.

[Structure for Preventing Contamination of Foreign Matter]

Figure 18:
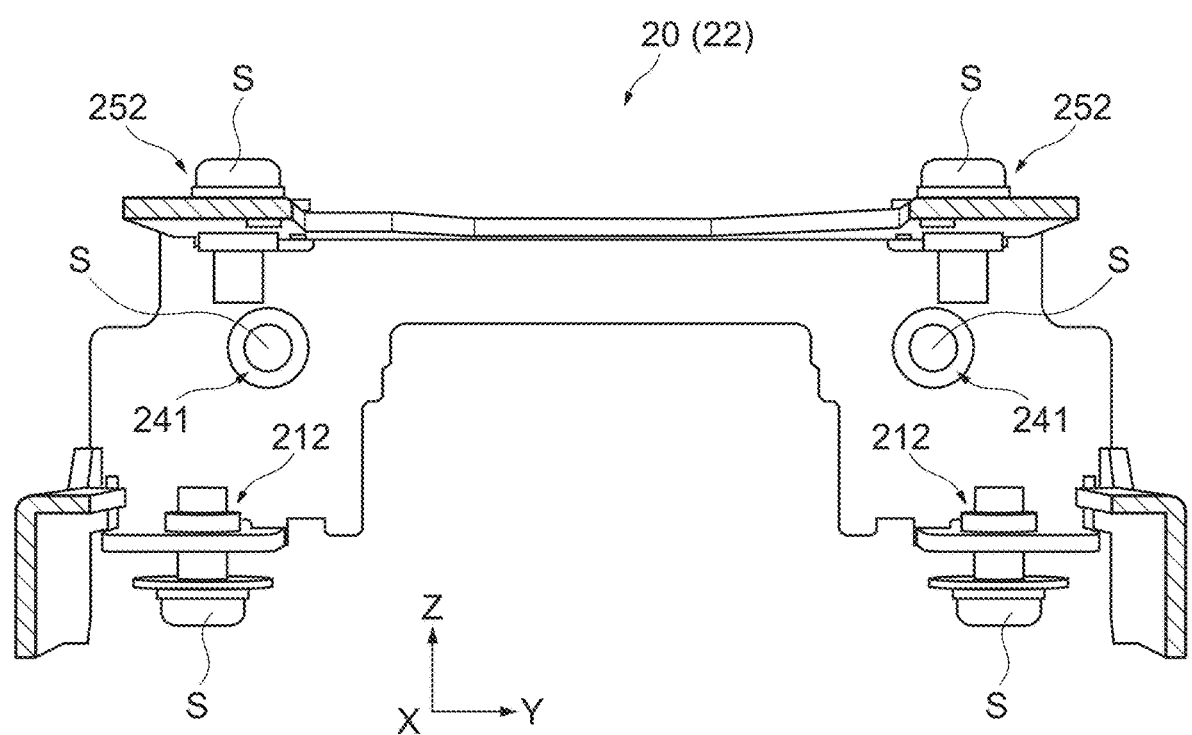
FIG. 18 is a cross-sectional view of the frame taken along the line A-A' of FIG. 5.

FIG. 18 is a cross-sectional view of the frame 20 taken along the A-A' line of FIG. 5. That is, FIG. 18 shows the rear portion of the raised portion 22 in the X-axis direction from the front while the raised portion 22 is broken along the Y-Z plane. For convenience of description, FIG. 18 shows the screw members S for fixing the main board 13, the bottom case 12, and the shield plate 16 to the frame 20.

In the screw hole portions 212 for fixing the main board 13, the screw members S penetrate upward from below in the Z-axis direction. In the screw hole portions 241 for fixing the bottom case 12, the screw members S penetrate from the rear to the front in the X-axis direction. In the screw hole portions 252 for fixing the shield plate 16, the screw members S penetrate downward from above in the Z-axis direction.

That is, the screw members S fastened to the screw hole portions 212, 241, and 252 all have their distal end portions exposed to the space within the raised portion 22 of the frame 20. Thus, when the screw members S are screwed into the screw hole portions 212, 241, and 252, foreign matter such as chips is easily mixed into the space within the raised portion 22.

In this regard, in the vehicle-mounted camera 1 according to this embodiment, it is favorable to provide a first cap member 41, a second cap member 42, and a third cap member 43 that cover the screw hole portion 212, the screw hole portion 241, and the screw hole portion 252 from the inside of the raised portion 22 as a structure for preventing foreign matter from being mixed into the space within the raised portion 22 of the frame 20.

Figure 19:
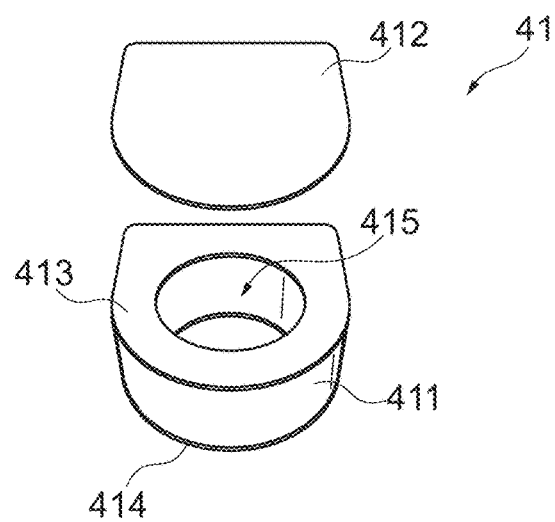
FIG. 19 is an exploded perspective view of a first cap member of the vehicle-mounted camera.

FIG. 19 is an exploded perspective view of the first cap member 41 that covers the screw hole portion 212 of the frame 20. The cap member 41 has a stacked structure including a main body layer 411, a sealing layer 412, an adhesive layer 413, and an adhesive layer 414. The adhesive layers 413 and 414 are provided on both surfaces facing each other in the thickness direction of the main body layer 411.

An opening 415 penetrating in the thickness direction is formed in the main body layer 411 and the adhesive layers 413 and 414. The sealing layer 412 is bonded onto the adhesive layer 413 to seal the opening 415. As a result, the cap member 41 has a cap shape in which the opening 415 is opened only on the adhesive layer 414 side opposite to the adhesive layer 413.

Figure 20:
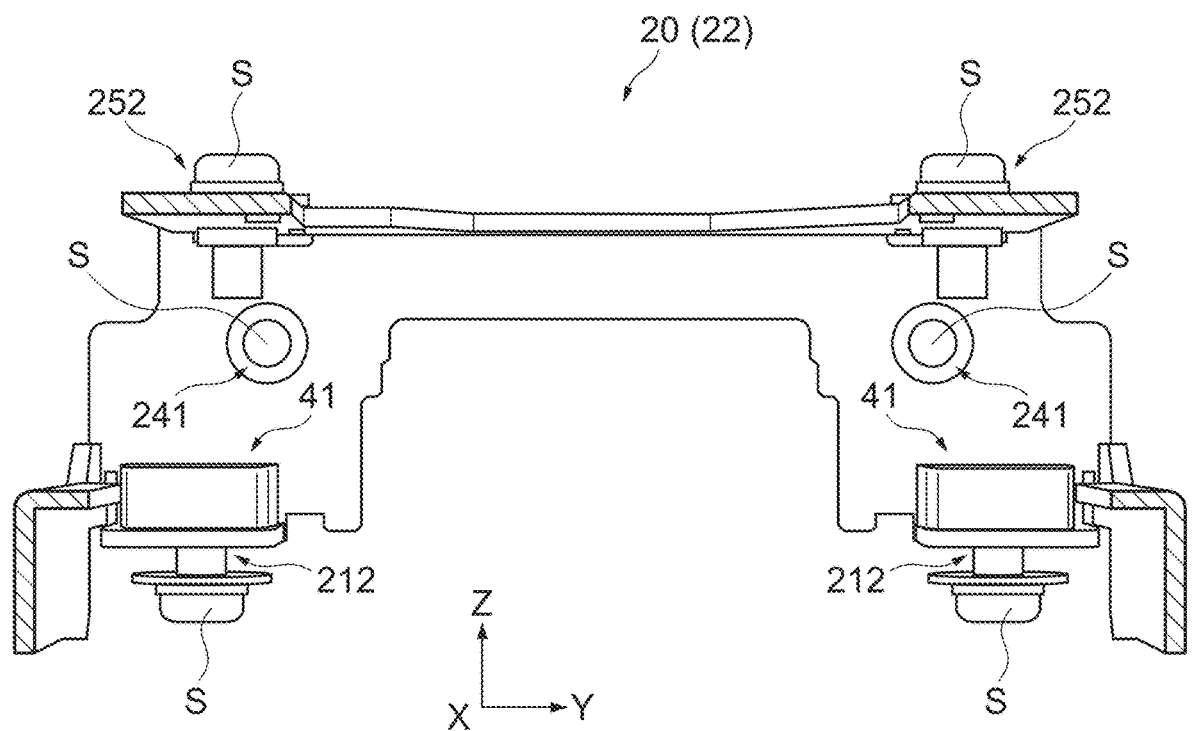
FIG. 20 is a cross-sectional view showing a state of attaching the first cap member to the frame shown in FIG. 18.

FIG. 20 is a cross-sectional view showing a state of attaching the cap member 41 to the frame 20 shown in FIG. 18. The cap member 41 is bonded to the frame 20 by the adhesive layer 414 having the opening 415 opened. The cap member 41 is disposed in each screw hole portion 212 such that each screw hole portion 212 enters the inside of the opening 415.

Thus, in the frame 20, the region where the distal end portion of the screw member S fastened to the screw hole portion 212 from below in the Z-axis direction protrudes is closed by the cap member 41. Thus, the foreign matter generated when the screw member S is screwed into the screw hole portion 212 remains in the opening 415 of the cap member 41 and is not discharged to the outside of the opening 415 of the cap member 41.

Therefore, in the vehicle-mounted camera 1, when the screw member S is screwed into the screw hole portion 212, it is possible to prevent foreign matter from being mixed into the space within the raised portion 22 of the frame 20. Thus, in the vehicle-mounted camera 1, it is possible to prevent a problem due to the contamination of the foreign matter into the space within the raised portion 22, such as an operation failure of the electric circuit.

Additionally, for example, even if a very thin sealing layer 412 of about 0.1 mm is used in the cap member 41, the function of closing the screw hole portion 212 is ensured. Thus, in the vehicle-mounted camera 1, the amount of protrusion of the cap member 41 to the inside of the raised portion 22 of the frame 20 is suppressed to be small, so that the space within the raised portion 22 of the frame 20 can be saved.

Figure 21:
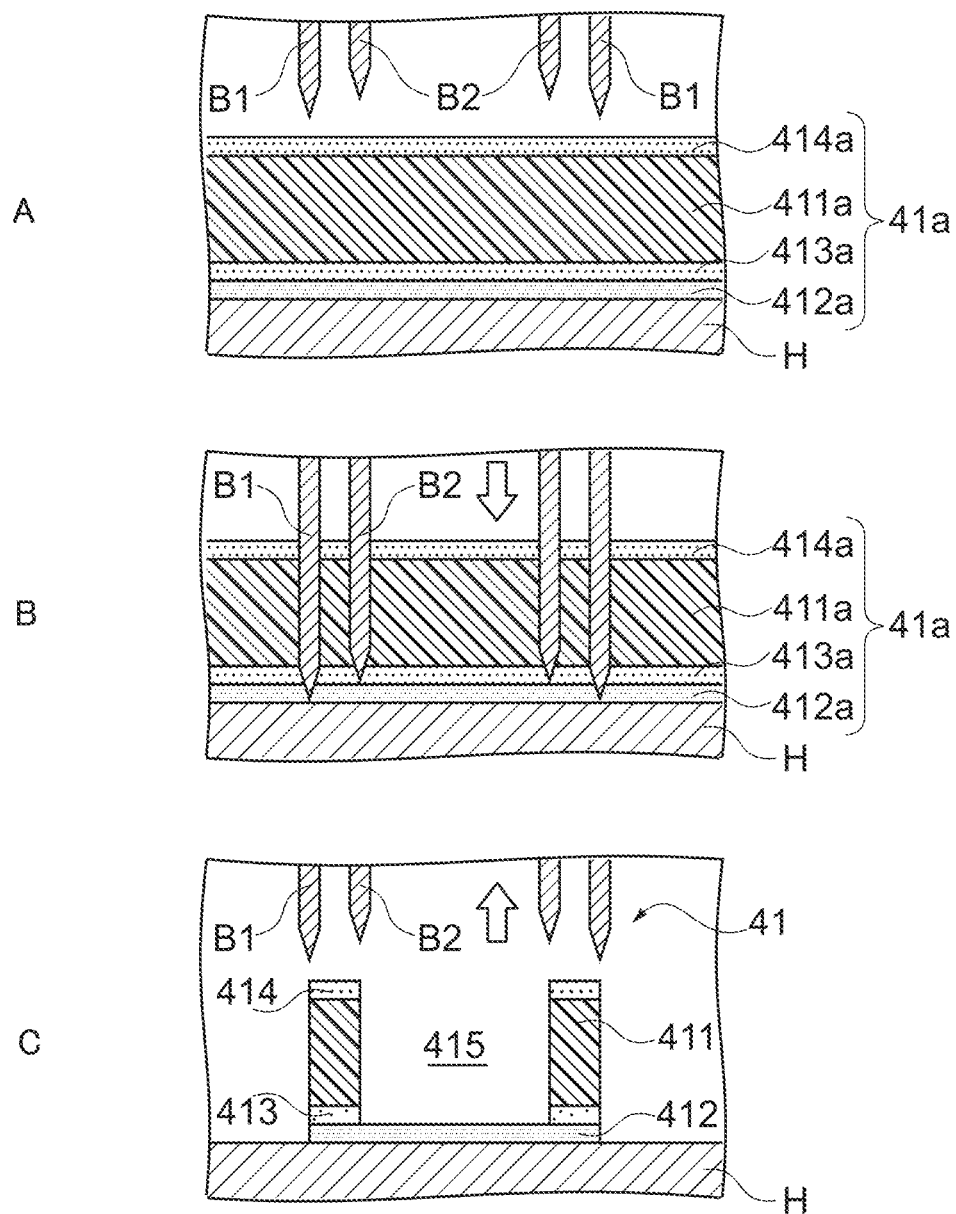
FIG. 21 is a cross-sectional view showing a manufacturing process of the first cap member.

FIG. 21 is a cross-sectional view showing a manufacturing process of the cap member 41. For manufacturing the cap member 41, first, a laminated sheet 41a is prepared. The laminated sheet 41a is a large-sized sheet including a main body sheet 411a corresponding to the main body layer 411, a sealing sheet 412a corresponding to the sealing layer 412, and adhesive sheets 413a and 414a corresponding to the adhesive layers 413 and 414.

First, as shown in FIG. 21(A), the laminated sheet 41a is disposed on a holding plate H with the adhesive sheet 414a facing upward. Then, punching dies B1 and B2 are disposed above the laminated sheet 41a with the cutting edges thereof facing downward. The cutting edge of the punching die B2 is positioned higher than the cutting edge of the punching die B1 by the thickness of the sealing sheet 412a.

The blade of the punching die B1 is formed in a shape corresponding to the outer shape of the cap member 41. The blade of the punching die B2 is formed in a shape corresponding to the opening 415 of the cap member 41. The punching dies B1 and B2 are fixed to each other in the upper parts thereof and are movable in the vertical direction as one unit while maintaining their relative positions.

The laminated sheet 41a is punched by lowering the punching dies B1 and B2 as shown in FIG. 21(B) from the state shown in FIG. 21(A). The punching die B1 reaches the holding plate H and cuts all the sheets 411a, 412a, 413a, and 414a of the laminated sheet 41a. As a result, the outer shape of the cap member 41 is formed.

On the other hand, the punching die B2 remains in front of the holding plate H and does not penetrate the sealing sheet 412a of the lowermost layer. Thus, the punching die B2 cuts the sheets 411a, 413a, and 414a, but does not cut the sealing sheet 412a of the lowermost layer. As a result, the opening 415 of the cap member 41 is formed.

Subsequently, the punching dies B1 and B2 are raised from the state shown in FIG. 21(B). Then, in the laminated sheet 41a, the portion outside the punching die B1 and the portion inside the punching die B2 are removed, and only the portion between the punching dies B1 and B2 is left. As a result, the cap member 41 is obtained as shown in FIG. 21(C).

In this manner, using the laminated sheet 41a, the cap member 41 can be easily manufactured by only one punching operation. Further, the laminated sheet 41a is simultaneously punched using the plurality of punching dies B1 and B2, and thus it is possible to manufacture a large number of cap members 41 at a time. As a result, the cap member 41 can be manufactured at low cost. Note that it is needless to say that the punching operation for the laminated sheet 41a may be performed for each of the punching dies B1 and B2 as necessary.

The material for forming the main body layer 411 (the main body sheet 411a of the laminated sheet 41a) of the cap member 41 is not limited to a specific type, but is favorably a resin material having excellent punchability. Examples of the resin material having excellent punchability include a urethane cushion, a sponge, and an elastomer.

The material for forming the sealing layer 412 (the sealing sheet 412a of the laminated sheet 41a) of the cap member 41 is also not limited to a specific type, and for example, polycarbonate (PC), polyethylene polyethylene terephthalate (PET), or the like can be used. As the adhesive layers 413 and 414 of the cap member 41, for example, an inexpensive double-sided adhesive tape or the like can be used.

Figure 22:
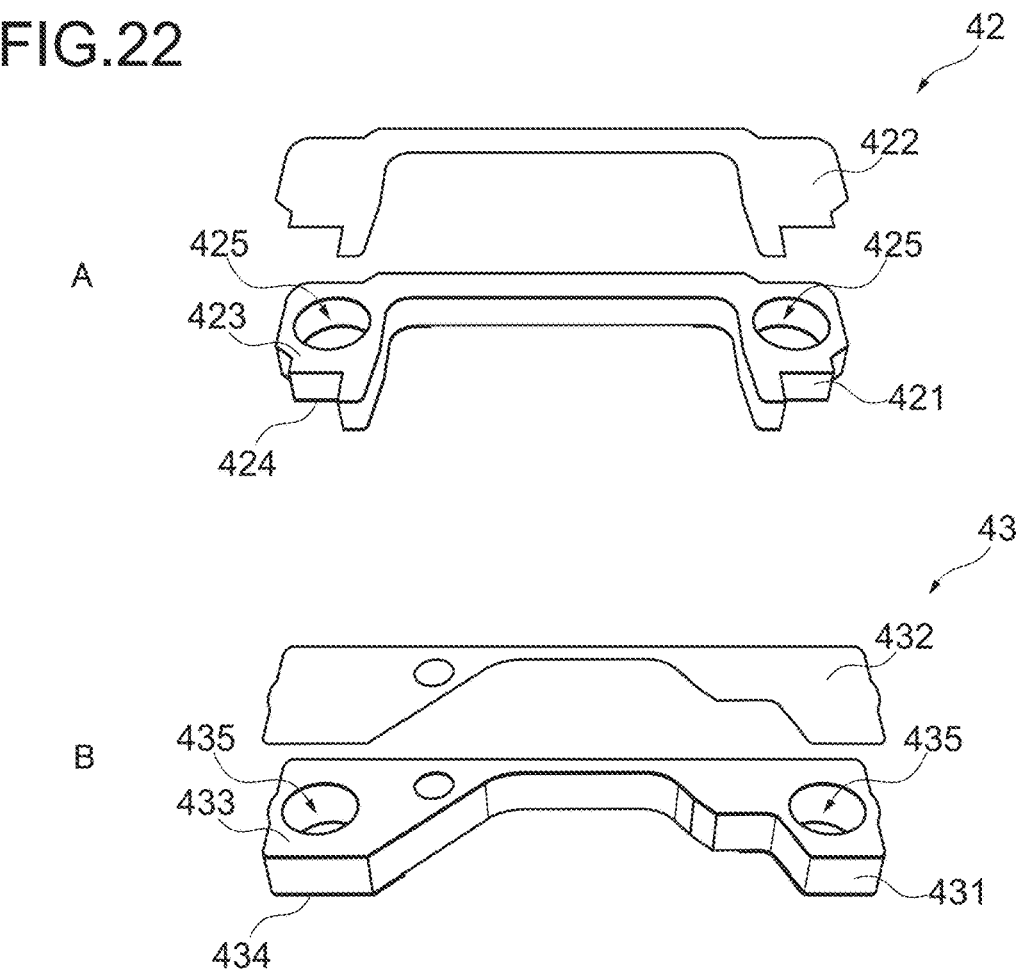
FIG. 22 is an exploded perspective view of second and third cap members of the vehicle-mounted camera.

FIG. 22(A) is an exploded perspective view of the second cap member 42 that covers the screw hole portions 241 of the frame 20. FIG. 22(B) is a perspective view of the third cap member 43 that covers the screw hole portions 252 of the frame 20. The cap members 42 and 43 can be manufactured by the same manufacturing method using the same material as that of the first cap member 41.

The cap member 42 has a stacked structure including a main body layer 421, a sealing layer 422, an adhesive layer 423, and an adhesive layer 424. The cap member 43 has a stacked structure including a main body layer 431, a sealing layer 432, an adhesive layer 433, and an adhesive layer 434. The cap members 42 and 43 are configured to capable of collectively closing the two screw hole portions 241 and 252, respectively.

More specifically, the cap members 42 and 43 have an elongated shape so as to be capable of simultaneously respectively closing the two screw hole portions 241 and 252 disposed at both end portions of the frame 20 in the Y-axis direction. The cap members 42 and 43 respectively include two openings 425 and 435 corresponding to the two screw hole portions 241 and 252 at both end portions in the longitudinal direction.

Figure 23:
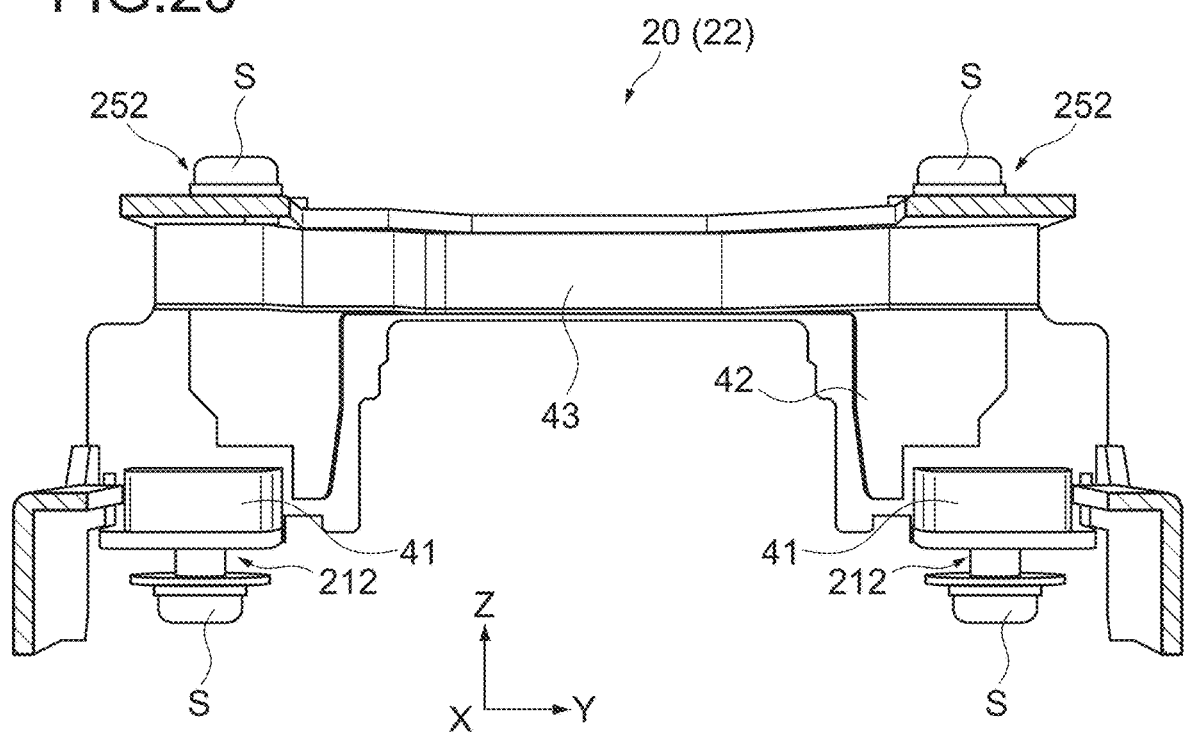
FIG. 23 is a cross-sectional view showing a state of attaching the second and third cap members to the frame shown in FIG. 20.

FIG. 23 is a cross-sectional view showing a state of attaching the cap members 42 and 43 to the frame 20 shown in FIG. 20. As shown in FIG. 23, in the frame 20, the screw hole portions 241 are closed by the cap member 42 from the front in the X-axis direction, and the screw hole portions 252 are closed by the cap member 43 from below in the Z-axis direction.

Therefore, in the vehicle-mounted camera 1, when the screw members S are screwed into the screw hole portions 241 and 252, it is possible to prevent foreign matter from being mixed into the space within the raised portion 22 of the frame 20. Thus, in the vehicle-mounted camera 1, it is possible to prevent a problem due to contamination of foreign matter into the space within the raised portion 22, such as an operation failure of the electric circuit.

In the vehicle-mounted camera 1, since the single cap members 42 and 43 are capable of collectively closing the two screw hole portions 241 and 252, respectively, it is possible to reduce the cost due to a decrease in the number of components. Note that the cap member according to this embodiment can be configured to include three or more openings when three or more screw hole portions to be closed are present on the same plane.

Similarly to the first cap member 41, the cap members 42 and 43 are capable of suppressing the amount of protrusion to the inside of the raised portion 22 of the frame 20. Thus, as shown in FIG. 23, the cap members 42 and 43 are capable of closing, without force, the screw hole portions 241 and 252 provided at positions close to each other on planes orthogonal to each other.

[Another Configuration Example of Vehicle-Mounted Camera 1]

The configuration of the vehicle-mounted camera 1 is not limited to the above and can be variously modified. For example, the vehicle-mounted camera 1 may include a plurality of imaging units 14. In this case, the direction of the optical axis P of the optical unit 141 may be made different from one another by using the holder 30 in which the angle θ of the regulating surface 34 is different for each imaging unit 14.

Additionally, the vehicle-mounted camera 1 can be attached not only to the windshield M01, but also to the rear window M02 as a rear-sensing camera. Moreover, the vehicle-mounted camera 1 may be used for, for example, viewing, not for sensing. In this case as well, the vehicle-mounted camera 1 has the merit of being capable of compatibility between miniaturization and high functionality.

Further, the method of attaching the vehicle-mounted camera 1 to the inner surface of the windshield M01 is not limited to the configuration using the bracket 2 as shown in FIG. 3. For example, the vehicle-mounted camera 1 may be fixed to the windshield M01 via a member other than the bracket 2 or may be directly bonded to the inner surface of the windshield M01.

In addition, the vehicle-mounted camera 1 does not need to be inclined along the inner surface of the windshield M01. When the vehicle-mounted camera 1 is installed with the X-axis facing in the horizontal direction, the optical axis P of the optical unit 141 does not need to be inclined with respect to the X-axis. In this case, the holder 30 is formed such that the regulating surface 34 is orthogonal to the X-axis.

Additionally, the arrangement of the regulating surface 34 of the holder 30 in the vehicle-mounted camera 1 is not limited to the above. For example, the regulating surface 34 may extend not around the pair of columnar portions 32 but around the holding portion 31. Additionally, the regulating surface 34 may continuously extend in a wide area extending around the pair of columnar portions 32 and around the holding portion 31.

Further, in the vehicle-mounted camera 1, the positioning unit including the columnar portion 32 and the screw hole portion 33 of the holder 30, the through-hole portion 233 of the frame 20, and the through-hole portion 117 of the front case 11 only needs to be provided at least two places, but it may be provided at three or more places if necessary.

In addition, the front case 11 of the vehicle-mounted camera 1 does not need to include the boss portion 116. That is, the front case 11 only needs to be configured to be fixed to the frame 20 by being sandwiched between the head of the screw member S inserted through the through-hole portion 117 and the frame 20 even if the portion where the through-hole portion 117 is provided is not the boss portion 116.

Note that the vehicle-mounted camera 1 is applicable not only to the automobile M, but also to various movable bodies. Examples of a movable body to which the vehicle-mounted camera 1 is applicable include an automobile, an electric vehicle, a hybrid electric vehicle, a motorcycle, a bicycle, personal mobility, an airplane, a drone, a ship, a robot, construction machinery, and agricultural machinery (a tractor).

Other Embodiments

The embodiment of the present technology has been described above.

However, of course the present technology is not limited to the embodiment described above, and various modifications may be made thereto without departing from the scope of the present technology.

Note that the present technology may also take the following configurations.

(1) A vehicle-mounted camera, including:
  an optical unit including a lens;
  a frame including
    a front wall portion having a flat plate shape and extending along a plane orthogonal to an axis, and
    a pair of first through-hole portions provided to the front wall portion;
  a cover member including a pair of second through-hole portions adjacent to the pair of first through-hole portions in a forward direction of the axis;
  a holder including
    a holding portion that holds the optical unit,
    a pair of columnar portions that protrude in the forward direction and are inserted into the pair of first through-hole portions and the pair of second through-hole portions from a rearward direction of the axis, and
    a pair of screw hole portions formed toward the rearward direction from distal end portions of the pair of columnar portions; and
  a pair of screw members that fix the holder and the cover member to the frame by being inserted into the pair of second through-hole portions from the forward direction and fastened to the pair of screw hole portions.

(2) The vehicle-mounted camera according to (1), further including
  an imaging device board disposed on a back surface of the holder, the back surface facing in the rearward direction.

(3) The vehicle-mounted camera according to (2), in which
  the imaging device board faces at least one of the pair of screw hole portions in the rearward direction.

(4) The vehicle-mounted camera according to any one of (1) to (3), in which
  the pair of screw hole portions do not penetrate the holder in the rearward direction.

(5) The vehicle-mounted camera according to any one of (1) to (4), in which
  the optical unit has an optical axis inclined with respect to the axis.

(6) The vehicle-mounted camera according to (5), in which
  the holder further includes a regulating surface inclined with respect to a plane orthogonal to the optical axis and regulated by a back surface of the front wall portion, the back surface facing in the rearward direction.

(7) The vehicle-mounted camera according to (6), in which
  the regulating surface includes a pair of regulating surfaces respectively extending around rear end portions of the pair of columnar portions.

(8) The vehicle-mounted camera according to any one of (1) to (7), in which
  the cover member further includes a pair of boss portions that protrude in the direction of the axis and include the pair of second through-hole portions.

(9) The vehicle-mounted camera according to any one of (1) to (8), in which
  the cover member is a resin molded product.

(10) The vehicle-mounted camera according to any one of (1) to (9), in which
  the frame is a sheet metal processed product.

(11) The vehicle-mounted camera according to any one of (1) to (10), in which
  the holder is a die-cast product.

DESCRIPTION OF REFERENCE SYMBOLS/REFERENCE NUMERALS 1 vehicle-mounted camera
2 bracket
11 front case
113 lens hole
116 boss portion
117 through-hole portion
12 bottom case
13 main board
14 imaging unit
141 optical unit
142 imaging device board
15 pressing member
16 shield plate
20 frame
21 flat portion
22 raised portion
23 front wall portion
231 lens hole
233 through-hole portion
30 holder
31 holding portion
32 columnar portion
33 screw hole portion
34 regulating surface
50 flexible board
M automobile
M01 windshield
S screw member
P optical axis
Q orthogonal plane

The invention claimed is:

1. A vehicle-mounted camera, comprising:
  an optical unit including a lens;
  a frame including
    a front wall portion having a flat plate shape and extending along a plane orthogonal to an axis, and
    a pair of first through-hole portions provided to the front wall portion;
  a cover member including a pair of second through-hole portions adjacent to the pair of first through-hole portions in a forward direction of the axis;
  a holder including
    a holding portion that holds the optical unit,
    a pair of columnar portions that protrude in the forward direction and are inserted into the pair of first through-hole portions and the pair of second through-hole portions from a rearward direction of the axis, and a pair of screw hole portions formed toward the rearward direction from distal end portions of the pair of columnar portions; and a pair of screw members that fix the holder and the cover member to the frame by being inserted into the pair of second through-hole portions from the forward direction and fastened to the pair of screw hole portions, wherein the pair of screw hole portions do not penetrate through the holder in the rearward direction.

2. The vehicle-mounted camera according to claim 1, further comprising an imaging device board disposed on a back surface of the holder, the back surface facing in the rearward direction.

3. The vehicle-mounted camera according to claim 2, wherein the imaging device board faces at least one of the pair of screw hole portions in the rearward direction.

4. The vehicle-mounted camera according to claim 1, wherein the optical unit has an optical axis inclined with respect to the axis.

5. The vehicle-mounted camera according to claim 4, wherein the holder further includes a regulating surface inclined with respect to a plane orthogonal to the optical axis and regulated by a back surface of the front wall portion, the back surface facing in the rearward direction.

6. The vehicle-mounted camera according to claim 5, wherein the regulating surface includes a pair of regulating surfaces respectively extending around rear end portions of the pair of columnar portions.

7. The vehicle-mounted camera according to claim 1, wherein the cover member further includes a pair of boss portions that protrude in the direction of the axis and include the pair of second through-hole portions.

8. The vehicle-mounted camera according to claim 1, wherein the cover member is a resin molded product.

9. The vehicle-mounted camera according to claim 1, wherein the frame is a sheet metal processed product.

10. The vehicle-mounted camera according to claim 1, wherein the holder is a die-cast product.

* * * * *